United States Patent [19]
Yoshimura et al.

[11] Patent Number: 5,402,410
[45] Date of Patent: Mar. 28, 1995

[54] HIGH DENSITY STORAGE OF INFORMATION ON A SUBSTRATE WITH MULTIPLE DEPTH AND HEIGHT

[75] Inventors: Toshiyuki Yoshimura, Kokubunji; Shigeru Kakumoto, Kodaira; Shinji Okazaki, Urawa; Yuji Toda, Hachiouji, all of Japan

[73] Assignee: Hitachi, Ltd., Tokyo, Japan

[21] Appl. No.: 810,328

[22] Filed: Dec. 19, 1991

[30] Foreign Application Priority Data

Dec. 20, 1990 [JP] Japan .................. 2-404154

[51] Int. Cl.⁶ .................. G11B 7/26; G11C 13/00
[52] U.S. Cl. .................. 369/275.1; 369/101; 369/275.3; 365/118
[58] Field of Search .............. 369/272, 275.1, 275.3, 369/275.4, 277, 283, 106, 109, 122, 112, 13, 101; 365/106, 118; 280/306, 307

[56] References Cited

U.S. PATENT DOCUMENTS

| | | | |
|---|---|---|---|
| 4,764,818 | 8/1988 | Crew | 369/101 |
| 4,874,213 | 10/1989 | Cowan | 350/3.67 |
| 4,961,178 | 10/1990 | Matsuda et al. | 369/101 |
| 4,982,362 | 1/1991 | Comberg et al. | 369/101 |
| 5,122,663 | 6/1992 | Chang et al. | 369/101 |
| 5,126,996 | 6/1992 | Iida et al. | 369/272 |
| 5,144,552 | 9/1992 | Abe | 369/275.3 |
| 5,150,339 | 9/1992 | Ueda et al. | 369/275.4 |
| 5,168,490 | 12/1992 | Brant | 369/275.1 |
| 5,204,852 | 4/1993 | Nakagawa et al. | 369/275.1 |
| 5,235,587 | 8/1993 | Bearden et al. | 369/106 |

FOREIGN PATENT DOCUMENTS

63-257921 10/1988 Japan .
02-195638 2/1990 Japan .

OTHER PUBLICATIONS

Emoto, 8 NM Wide Line Fabrication in PMMA on Si Wafers by Electron Beam Exposure, Oct. 1985, vol. 24, No. 10, Japanese Journal of Applied Physics, pp. L809–L811.

*Primary Examiner*—Paul M. Dzierzynski
*Assistant Examiner*—Kim-Kwok Chu
*Attorney, Agent, or Firm*—Antonelli, Terry, Stout & Kraus

[57] ABSTRACT

A high density storage medium which stores predetermined information by matching it on one-to-one basis with multiple levels of depth or height formed in predetermined plural areas of substrate surface, a storing method, a reading method and various systems using them have been disclosed.

71 Claims, 17 Drawing Sheets

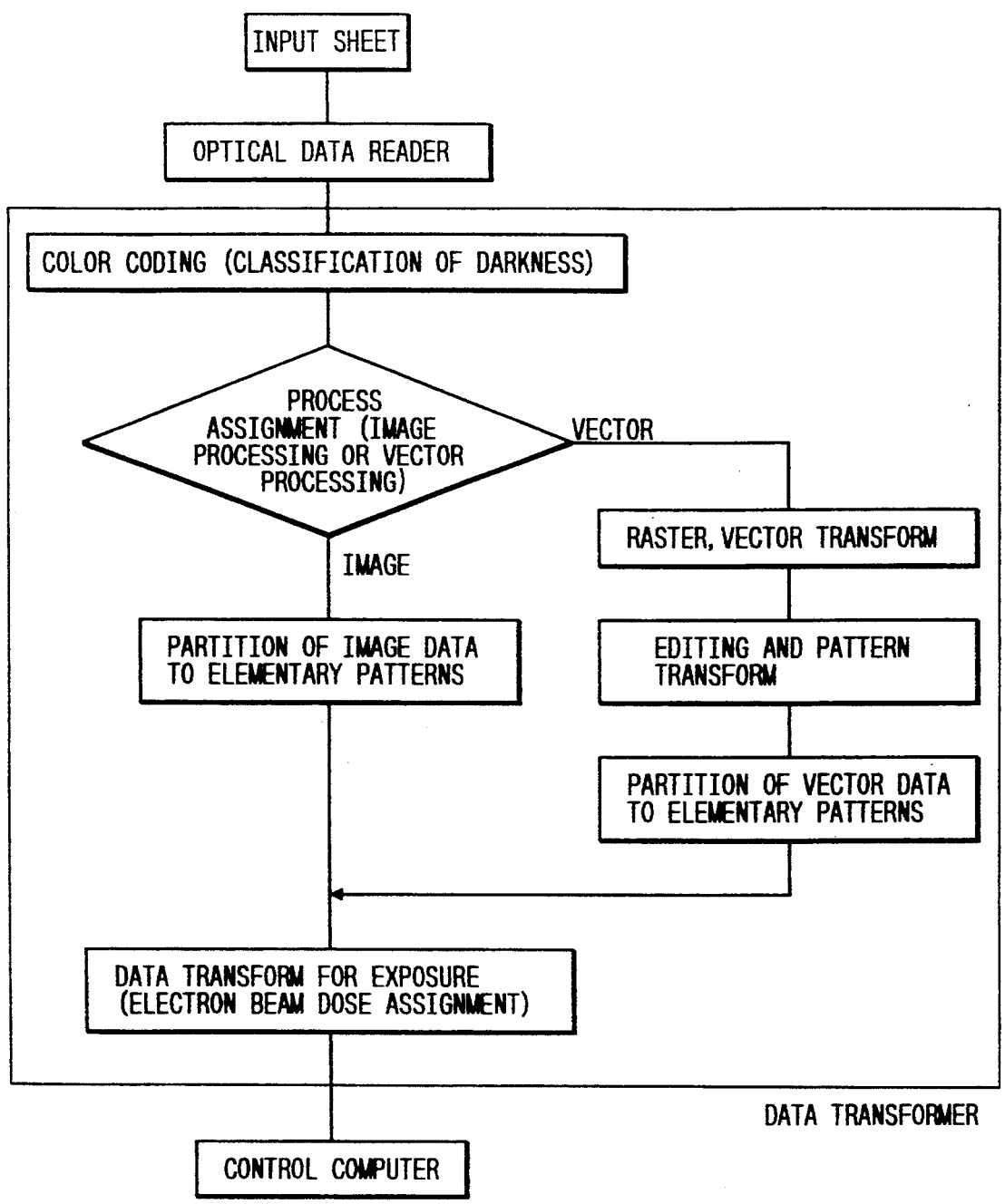

HIGH DENSITY STORAGE OF INFORMATION ON A SUBSTRATE WITH MULTIPLE DEPTH AND HEIGHT

BACKGROUND OF THE INVENTION

1. Field of the Invention

The present invention relates to a high density data storage device using particle beam and its reading apparatus, in particular to a high density data storage device capable of improving storage density by storing each data at different position and height in the storage medium, a reading apparatus for high density data using particle beam and a system using these devices.

2. Description of the Prior Art

Efforts have been made up to present to reduce the area of storage by using microfilm to store and preserve documents. In the case of an ordinary microfilm, for instance, an A-4 size document (297 millimeter high and 210 millimeter wide) is stored by being reduced to about 1 centimeter. Reproduction of the document content becomes possible by enlarging the content of the microfilm. As a result, the area of document storage was reduced by over 1/600, improving the efficiency of document storage. With the increase in document items, however, this method has become insufficient and has led to the proposal for methods of high density data storage that are publicly known such as optical disk, magnetic disk and magneto-optical disk. Optical disk, for instance, stores data by irradiating narrowly focused laser beam to the storage medium and forming a small hole called a pit on the storage medium. Meanwhile, a method of reading the stored data by irradiating narrowly focused laser beam to the storage medium, as done at the time of data storage, and detecting reflection from the storage medium is used to read the data that has been stored. Since reducing the pit size will improve the density of storage, realization of pits about the size of approximately 1 μm has led to expansion of the volume of data storage. In addition, the use of magnet or light for storage and reading of data in magnetic disks and magneto-optical disks has resulted in expansion of the volume of data storage through reduction of data storage unit as in optical disks.

A means for storing two different series of data on the same substrate by changing the pit depth to increase the volume of storage in an optical disk has been proposed as described, for instance, in Japanese Patent Application Laid Open No. 63-257921.

Moreover, a method using electron beams for data storage has also been proposed. For instance, as described in Japanese Patent Application Laid Open No. 2-195638, it is a method for storing the content of sample structure by irradiating an electron beam that permeated a sample to a two-dimensional sensor called a fluorescent recording sheet. The stored data is read by discharging light from the foregoing two-dimensional sensor through irradiation of light or heating. High-sensitivity storage of electron beam microscope image has become possible as a result.

Moreover, the development of a navigation system which is equipped with a storage medium for storing map data and with a means for detecting the current position of a mobile unit, and performs movement control of a mobile unit by comparing that map information with the current position of the mobile unit is recently under way for safe operation of mobile units, particularly for automobiles. Generally, map data is stored in an optical disk, and current position is judged by comparing with map data that has been stored by detecting radio wave from radio wave sources that are installed at various points on the street and from satellites.

Furthermore, an overhead projection method is already known as a method wherein characters and patterns are drawn on films made of plastic etc. and the foregoing characters and patterns are projected on a screen via magnification lens after transmitting visible radiation through it.

Another method already known is microfilm, which is a method wherein document data is photographed on a film and magnified via projection lens for reading.

The feature of these conventional technologies is that they read out the content of data stored on a storage medium, i.e. film, by projecting image through transmission of light through a film. These technologies are used in many areas because of their simple operation and small data storage space requirement.

Among the foregoing conventional technologies, however, optical disk, magnetic disk and magneto-optical disk have a problem of difficulty in reducing the minimum data storage unit to below 0.5 μm. There is an additional problem of the limitations in improving data storage density at the time of storing data because the status of data storage is in two values (1 and 0). The foregoing publicly-known example of an optical disk is basically limited to storage of two value data. Moreover, there was a problem of difficulty in reading data at any location on a storage medium because data reading was performed sequentially.

Furthermore, the high sensitivity storage by electron beam microscope according to the foregoing conventional technology is not suitable for improving data storage density because the image stored on a two-dimensional sensor is a magnified image of a sample.

SUMMARY OF THE INVENTION

The object of the present invention is to provide a storage medium which is capable of storing data in higher density compared to the conventional technology and its method of production and its storage device and reading apparatus, a large capacity filing system which stores information in higher density compared to the conventional technology and facilitates reading of the stored data, a navigation system which is capable of storing a large volume of map information and a data display device which increases the volume of displayed data and simplifies the data reading method at the same time.

The foregoing object is achieved by a storage medium wherein each data is stored with high precision to have different position and height within a storage medium. In addition, the foregoing object is achieved by a storage device wherein storage in foregoing storage medium is performed by energy radiation. Furthermore, the foregoing object is achieved by a reading apparatus for detecting a signal which is generated when an energy radiation identical or not identical to that used during data storage is irradiated. In this case, energy radiation is a general term for optical, X ray, gamma ray, electron beam and ion radiation.

In addition, the foregoing object is achieved by the foregoing storage medium wherein large volume of data is stored, a means for reading the data stored in the foregoing storage medium according to the retrieving information and a large capacity filing system which possesses a means for outputting the data that has been read out.

Moreover, the foregoing object is achieved by a navigation system which is equipped with the foregoing storage medium storing map data and a means for detecting the current position of a mobile unit and performs movement control of a mobile unit by comparing the current position of a mobile unit with the foregoing map data.

Furthermore, the foregoing object is achieved by a data display unit comprised of a storage medium, which includes steps possessing multiple level depth or height formed in predetermined areas of substrate surface wherein the depth or height of the foregoing steps is independently correlated on one-on-one basis with the predetermined information, and by a lens system which magnifies the energy radiation that transmitted through or reflected from the foregoing storage medium or a system which detects and magnifies the energy radiation that was generated anew by the irradiation of the foregoing energy radiation, and which projects a pattern image on the foregoing storage medium to any location or observes such image.

The function of the present invention in data storage and reading is explained in the following through a case using electron beam in particular.

A process in production method of semiconductor device for forming a pattern is generally referred to as "lithography." A processing substrate is coated with an organic or inorganic material called "resist" by using a method such as spin coating. Subsequently, an energy radiation of ultraviolet ray, electron beam, X ray or ion beam is irradiated to form a latent image of desired pattern in a resist. After the irradiation, a pattern is formed by soaking the substrate coated with resist in a developing solution. In this case, those with latent image section of the foregoing pattern that becomes more soluble to developing solution are referred to as "positive type" while those with latent image section of the foregoing pattern that becomes less soluble to developing solution are referred to as "negative type." Thus, a desired pattern can be formed on a processing substrate through a lithography process which performs a series of processing such as formation of latent image by irradiation of particle beam and developing.

The method using electron beams for formation of latent image is referred to as "electron beam lithography." When forming a fine pattern through this method, a general method is to focus an electron beam which is emitted from an electron beam source by using a condensing lens and irradiate it on a resist. A fine resist pattern can be obtained as a result. For instance, as described in *Japanese Journal of Applied Physics*, vol. 24, p. L809, 1985, a fine resist pattern of 8 nanometer (1 micrometer = 1000 nanometer) was formed on a silicone substrate by using polymethylmethacrylate (abbreviation PMMA), an organic material. Any fine form can be created as much as the device allows by providing data on the pattern to be formed to a deflection circuit of an electron beam writing device.

In addition, in the foregoing resist, remaining film thickness after developing is determined solely by the electron beam dose as long as stable condition is maintained at the time of developing. In other words, it is possible to estimate the remaining film thickness after developing in advance, set up the dose necessary for such thickness and portion out dose for each pattern data, thereby controlling remaining film thickness with high precision. For instance, actual height can be stored by when storing map data by setting the dose for every contour line. Further, it is possible to make form and color of an input data correspond to the height of a resist pattern by setting dose according to such form and color. In addition, it is possible to make sound pitch, vector direction and size of scalar value correspond with the height of a resist pattern.

In the conventional method for reading optically in recognition of character data, eight scanning lines are used per millimeter in one example. In other words, characters are recognized in minimum unit (pixel) of 125 micrometer which means that any character or pattern can be expressed by using the minimum unit of 125 micrometer dot.

As mentioned in the foregoing, a pattern can be made fine by using an electron beam lithography, making it possible to easily form a 100 nanometer dot, for instance. In other words, it becomes possible to turn the foregoing pixel into a size of 100 nanometer. For this reason, it becomes possible to form a fine resist pattern on a processing substrate by reading a character or graphic data on paper through an optical means etc. and subsequently providing the data with reduced character information to a deflection circuit of an electron beam drawing device. In the case of an A-4 size document or graphic data, for instance, pixel will be 1/1250, which means that it can be stored in an area of 240 micrometer high and 170 micrometer wide (approximately 40,000 square micrometer in area) as each side will correspond to 1/1250. Approximately 200,000 pages of data can be stored if a silicon substrate of 4 inch diameter (approximately 100 millimeter) is used as a processing substrate and the entire surface of this substrate (about 8 billion micrometer in area) is utilized.

While the size of pixel was set to 100 nanometer in this example, data storage volume can be further increased by reducing the pixel size. For instance, setting the pixel size to 10 nanometer will increase the data storage volume by 100 times and will make storage of about 200 million pages of A-4 size documents possible. This data storage volume corresponds to over 1,000 times that of magnetic disk and magneto-optical disk. Data storage volume can be increased substantially by adding the foregoing height control to this greater data storage volume realized by the use of fine pixel. In other words, data storage density can be raised to further increase the data storage volume since data at each point of storage medium can be stored according to the height on the storage medium.

Generally, it is possible to have a beam position precision of approximately 10 nanometer in an electron beam drawing device. Accordingly, it is possible to control the position and height of data in a storage medium with high precision. As a result, data is stored with extremely high precision when storing map data, for instance. Such high precision data storage also becomes possible when the minimum unit of pixel does not have to be as small as mentioned in the foregoing.

Meanwhile, when reading data on processing substrate on which data is stored in high density, data can be read optically as long as the size of pixel is large. In other words, those on which a resist pattern, which corresponds to data with the foregoing position and height controlled with high precision, is formed on a processing substrate through which light such as visible radiation is transmitted, is used as a storage medium. Data is read by irradiating controlled light from the light source and by magnifying and projecting the transmitted light or by observing the magnified image. Since intensity modulation of transmitted light occurs due to difference in distance of transmission when light is transmitted through steps forms with different resist height, data volume can be increased as it becomes possible to give more gradation to the intensity of projected image compared to conventional means. In addition, since phase is also modulated at the time of light transmission, data volume can be increased compared to conventional means by increasing the contrast of the image through interference between adjacent patterns. Moreover, a similar effect can be obtained by using not only transmitted light but reflected light.

Furthermore, scanning electron beam microscope is used in the event where the pixel is too small for using light in reading data. Steps form of the surface can be observed by irradiating electron beam again on the processing substrate, detecting the secondary electron beam which is generated from the substrate at that time with semiconductor detecting device and putting that signal through graphic processing. The desired data can be read out by irradiating electron beam at the position of the area that needs to be reproduced. Since three-dimensional form of the surface can be reproduced here, an accurate reproduction of input data from the data that has been read out by accurately reading the data on processing substrate and by using graphic processing. As resolution within the screen and in the height direction can be set to several nanometers, identification of form pattern can be performed with little error.

The method of data storage by varying the height inside the storage medium, which is the foundation of the present invention, will be explained by using figures from FIG. 2 through FIG. 11. FIG. 2 shows the sensitivity characteristic of negative type electron beam resist under a certain developing condition. The axis of abscissas represents the electron beam dose and the axis of ordinates represents the remaining film thickness. This characteristic will remain constant at all times as long as the developing condition is constant. If the dose of $D_1$ is given, for instance, the remaining film thickness of a resist will be uniquely determined at $T_1$. Similarly, the remaining film thickness of a resist will be uniquely determined at $T_2$ and $T_3$ if dose given is $D_2$ and $D_3$. FIG. 3 through FIG. 6 explain the method of data storage using this method. A negative type electron beam resist 101 is coated on a substrate 100 in FIG. 3. An electron beam 102 is irradiated here. Assuming that the electron beam dose is $D_1$, $D_2$ and $D_3$ ($D_1<D_2<D_3$), the cross section form obtained after the development will correspond to the electron beam dose as shown in FIG. 4. A method of data storage which changes the height within a storage medium becomes possible in this manner. If dry etching is performed by using this resist pattern as a mask, a processing shown in FIG. 5 becomes possible by using the difference in etching resistivity between a substrate 100 and a negative type electron beam resist 101, thereby improving the stability of data storage. In addition, a form shown in FIG. 6 can be obtained by applying a coating material 103 after the processing to enable protection of storage medium surface.

Moreover, the foregoing method can be applied to a positive type electron beam resist. FIG. 7 shows the sensitivity characteristic of positive type electron beam resist. The axis of abscissas represents the electron beam dose while the axis of ordinates represents the remaining film thickness. As in FIG. 2, this characteristic will remain constant at all times as long as the developing condition is constant. If the dose of $D_4$ is given, for instance, the remaining film thickness of a resist will be uniquely determined at $T_4$. Similarly, the remaining film thickness of a resist will be uniquely determined at $T_5$ and $T_6$ if dose given is $D_5$ and $D_6$. A positive type electron beam resist 105 is coated on a substrate 104 in FIG. 8. An electron beam 106 is irradiated here. Assuming that the electron beam dose is $D_4$, $D_5$ and $D_6$ ($D_4<D_5<D_6$), the cross section form obtained after the development will correspond to the electron beam dose as shown in FIG. 9. A method of data storage which changes the height within a storage medium becomes possible in this manner. If dry etching is performed by using this resist pattern as a mask, a processing shown in FIG. 10 becomes possible by using the difference in etching resistivity between a substrate 104 and a positive type electron beam resist 105, thereby improving the stability of data storage. In addition, a form shown in FIG. 11 can be obtained by applying a coating material 107 after the processing to enable protection of storage medium surface.

Thus, storage density can be significantly improved by having steps possessing depth or height correspond with data at the time of storing data. The data volume will increase through a method wherein the height within a storage medium is changed in correspondence with the height of actual topography according to the contour line on a map.

Stored data and retrieving information for such stored data shall be stored in the storage medium for data reading so that retrieving information can be referred at the time of reading the stored data. At this point, data can be selected to read the necessary data, thereby increasing the efficiency of data retrieval. As the position of stored data on storage medium is included in retrieving information, a stage carrying storage medium in the reading device will move according to this position and reach the position of the predetermined stored data. The reason for the need to move the stage is to enlarge the range of data reading and increase the volume of data storage by moving the stage, as it is not possible to enlarge the deflection area of an energy radiation (electron beam in this case) that reads the data.

While the description up to this point centered around a device used for ordinary semiconductor process, compactization of the entire system can be pursued through the use of a fine field emitter as described, for instance, in Lecture No. 2p—K—11 (p. 585 of preliminary manuscript compilation) of the 36th Joint Meeting of the Societies Related to Applied Physics and in Lecture No. 28p—K—9 (p. 484 of preliminary manuscript compilation) of the 50th Academic Meeting of the Japan Society of Applied Physics. They are used for storage and reading of dictionary data, map data, illness diagnosis data, legal data and name data, and can handle a large volume of data in a simple manner. In addition, they can be utilized for automatic control system of a vehicle by obtaining data from outside and comparing it with large volume data.

The storage medium that has been formed can be duplicated by a stamper which is used in an ordinary optical disk and is produced in large quantities.

As for the reading method of stored data, steps form can be read by using light, charged particle, X ray, gamma ray, scanning tunneling electron microscope or atomic force microscope in addition to the use of an electron beam.

BRIEF DESCRIPTION OF THE DRAWINGS

FIG. 32 is a diagram explaining the flow of data from an input sheet to input data for electron beam drawing.

DETAILED DESCRIPTION OF THE PREFERRED EMBODIMENT

The present invention is explained in detail in the following through its embodiments.

Embodiment 1

Figure 1:
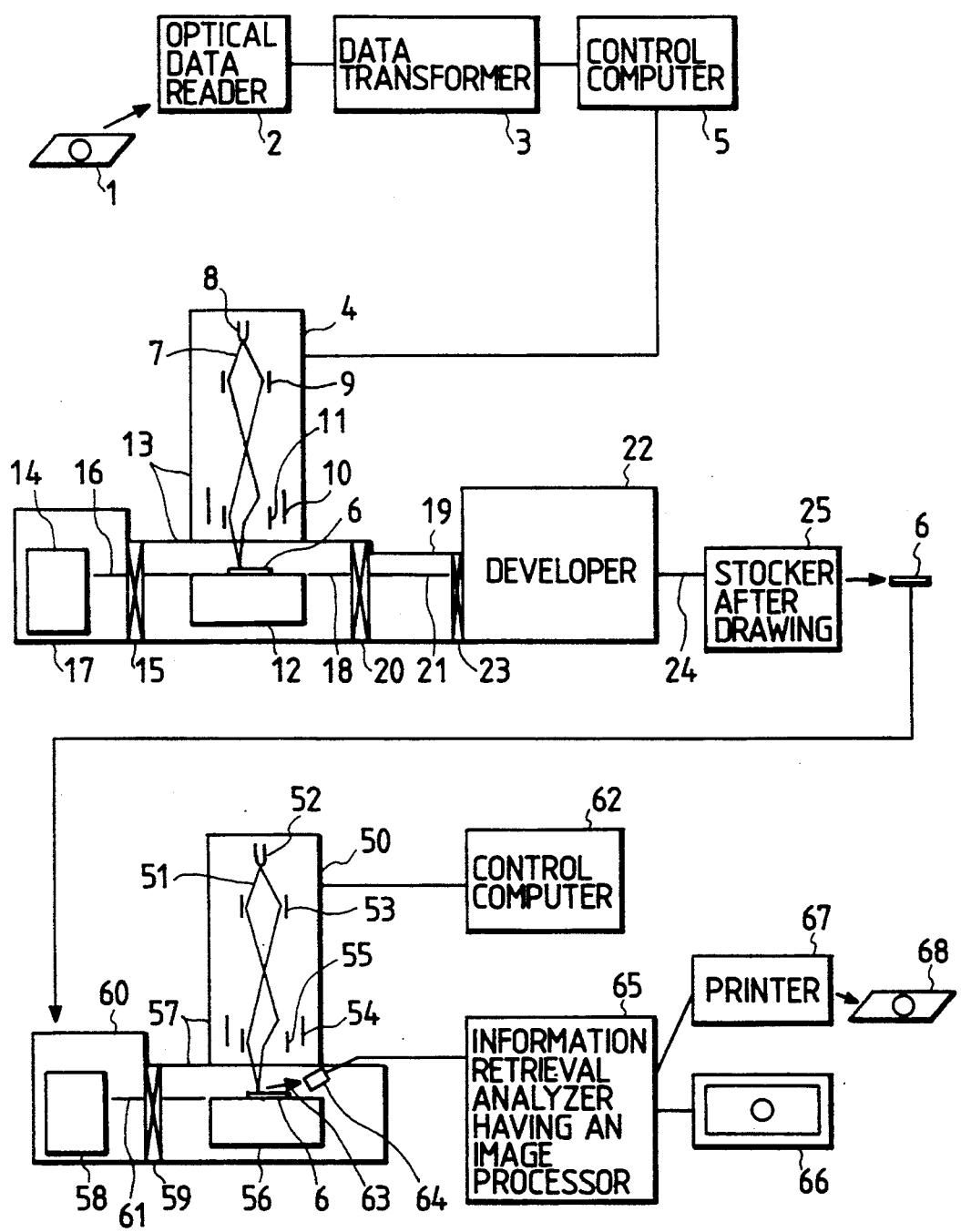
FIG. 1 is a structural diagram showing an embodiment of the present invention.

This embodiment explains a case where an electron beam is used particularly for data storage and reading in a formation of steps data by using FIG. 1.

The first explanation will concern a storage method and a production method of high density data. An input data 1 which possesses input data to be stored is put through a publicly known optical data reader 2 as shown in FIG. 1 to read the input data. The input data that has been read is transformed into digital data that can be input in a control computer 5 of a writing apparatus 4 which is similar to an electron beam drawing device by going through a data transformer 3. In this data transformation stage, digital data includes pattern position and drawing dose on a processing substrate 6 which is supposed to be written. In other words, identification is made according to form and color of characters and patterns in the input data to voluntarily allot electron beam dose etc. on a processing substrate 6. For instance, 5 $\mu C/cm^2$ of electron beam irradiation can be allotted to a blue pattern, 15 $\mu C/cm^2$ irradiation to a red pattern and 30 $\mu C/cm^2$ irradiation to a black pattern in an input data. In addition, actual dimensions and the position of pattern on a processing substrate 6 can be selected voluntarily, and these data will be stored at a certain portion of a processing substrate 6 and used at the time of reading the data. Moreover, processing and modification of data can be performed interactively through a data transformer 3.

The next description will be on the production method for data storage. As shown in FIG. 1, a writing apparatus 4 has the following structure. An electron beam 7 is emitted from an electron gun 8, passes through at least one condensing lens 9, one object lens 10 and one deflector 11 and irradiated on a processing substrate 6 after being condensed into a narrow beam. At this point, a processing substrate 6 is installed on a mobile stage 12 which offers a mechanism for moving a processing substrate 6 according to necessity so that electron beams can be irradiated on portions outside the deflection area of a deflector 11. A column 13 of a writing apparatus 4 is maintained at high vacuum inside by a high-vacuum pump such as an ion pump, and is isolated by a valve 15 from a sample exchange chamber 17 which is equipped with a pre-drawing stocker 14 for storing a processing substrate 6 prior to drawing. At this point, a 4 inch silicon wafer with negative type electron beam resist (e.g. RD-2000N, manufactured by Hitachi Chemical, Co., Ltd., a registered trademark) coated in thickness of 0.1 micrometer will be used. However, the size of a wafer and film thickness of a resist are not limited by the foregoing. When loading a processing substrate 6 on a pre-drawing stocker 14, it shall be performed after dropping the vacuum level of a sample exchange chamber 17 to atmospheric pressure, raising the vacuum level again after the loading in completed. For this reason, high vacuum will be maintained inside a column 13 at all times. After the vacuum of a sample exchange chamber 17 has risen to a sufficient level, a processing substrate 6 will move from a pre-drawing stocker 14 to a stage 12 via a conveyor belt 16. Then a command is sent from a control computer 5 to a deflector 11 and a stage 12 to draw a pattern at the desired position on a processing substrate 6. As greater acceleration voltage at an electron beam 7 is desired, an electron beam is irradiated on a processing substrate 6 after being accelerated by an acceleration voltage 30 kV, for instance. As stated above, irradiation on a processing substrate 6 will be given in accordance with input data since 5 μC/cm² has been allotted to a blue pattern, 15 μC/cm² to a red pattern and 30 μC/cm² to a black pattern. While minimum irradiation area of a pattern is dependent on the electron beam condensation capacity of a device, 0.1 μm, for instance, will result in irradiation of a large volume of data. Following the completion of drawing, a processing substrate 6 will be sent to a sample exchange chamber 19 via a conveyor belt 16. As a column 13 and a sample exchange chamber 19 are also isolated by a valve 20 here to offer a structure that will maintain high vacuum inside a column 13 at all times even if the pressure at a sample exchange chamber 19 is dropped to an atmospheric pressure to take out a processing substrate 6. At this point, an alignment mark which used in an ordinary semiconductor production process can be formed on a processing substrate 6 so that the drawing position can be determined accurately by reading this with an electron beam.

A processing substrate 6 with completed drawing is sent to a developer 22 via a conveyor belt 21. A valve 23 is also installed between a sample exchange chamber 19 and a developer 22 to isolate a sample exchange chamber 19 from outside. A mechanism for heating a processing substrate 6 by a hot plate before or after developing, a mechanism for performing developing operation by dropping ordinary developing solution, a mechanism for washing a processing substrate 6 with water and a control mechanism for developing atmosphere which dries a processing substrate 6 by centrifugation, isolates it from atmosphere and fills it with nitrogen are equipped inside a developer 22 to perform a series of developing processing. An ordinary alkaline developing solution, for instance, is used for developing solution, forming a pattern through 30 seconds of developing, 30 seconds of washing and 30 seconds of centrifugation drying. The height of a pattern following the formation was in accordance with the electron beam dose.

The storage of the data with minimum dimension of 0.1 μm that was supposed to be stored on a processing substrate 6 was completed in the foregoing manner. The foregoing processing has a mechanism for automatic control. A processing substrate 6 whose developing has completed is sent to a post-drawing stocker 25 via a conveyor belt 24 for storage.

While an electron beam dose was allotted according to the color of input pattern in this case, it can also be allotted according to the direction and size of vector such as speed and wind direction, or to the size of scalar volume such as form, sound pitch, temperature, depth and altitude. In other words, the type of data can be classified by dimension to one-dimensional data, two-dimensional data and three-dimensional data. As stated above, one-dimensional data include wavelength, frequency and oscillation of vibration of light and sound as well as the height of mountains and the depth of oceans which are map data. Two dimensional data includes maps with characters, pictures and contour lines, photographs, books, documents and images. Three-dimensional data includes three-dimensional vector volume such as an overpass of a road on the map, as well as wind and water velocity.

Generally, an electron beam scan on an electron beam drawing apparatus is highly effective in handling map data in particular owing to high precision of electron beam position.

Further, the content of data to be stored can be either digital signal or analog signal, i.e. since the remaining film thickness of a resist can be selected voluntarily, a digital signal can be assigned to take only specific values while an analog signal can have its continuous volume designated.

At this point, a processing substrate 6 whose developing has been completed can be either advanced to the next processing or covered with vaporization film of a metal film using metal such as gold or with a publicly known organic resin to protect its surface.

The next description will be on the method for reading data that has been stored on a processing substrate 6. As shown in FIG. 1, a reading apparatus 50, which is similar to a scanning electron beam microscope, is comprised of the following structure. An electron beam 51 is emitted from an electron gun 52 and passes through at least one condensing lens 53, one object lens 54 and one deflector 55 and irradiated on a processing substrate 6 after being converged into a focused beam. At this point, a processing substrate 6 is installed on a mobile stage 56 which offers a mechanism for moving a processing substrate 6 according to necessity so that electron beams can be irradiated on portions outside the deflection area of a deflector 55. A column 57 of a reading apparatus 50 is maintained at high vacuum inside by a high-vacuum pump such as an ion pump, and is isolated by a valve 59 from a sample exchange chamber 60 which is equipped with a stocker 58 for storing a processing substrate 6 prior to reading. When loading a processing substrate 6 on a stocker 58, it shall be performed after dropping the vacuum level of a sample exchange chamber 60 to atmospheric pressure, raising the vacuum level again after the loading is completed. For this reason, high vacuum will be maintained inside a column 57 at all times. After the vacuum of a sample exchange chamber 60 has risen to a sufficient level, a processing substrate 6 will move from a stocker 58 to a stage 56 via a conveyor belt 61. An electron beam 51 is irradiated on a processing substrate 6 at an acceleration voltage of 1 kV, for instance. At this point, assignment of irradiation area of an electron beam 51 and control of a stage 56 is performed by a control computer 62. When an electron beam 51 is irradiated on a processing substrate 6, a secondary electron beam or reflection electron beam 63 is generated and is detected by a semiconductor detector 64. Since the generation volume of this secondary electron beam or reflection electron beam 63 differs depending on the steps form of the surface, the structure of a processing substrate 6 surface can be reproduced accurately by processing it through an information retrieval analyzer having an image processor 65 and projecting it on a monitor 66. At this point, an irradiation area is assigned by reading the positional data which is written at a certain portion of a processing substrate 6 at the time of data storage. Moving of a stage 56 and assignment of deflection area for an electron beam 51 is performed in this manner.

Thus, a high density data storage system for storing data on a storage medium at high density by using an electron beam and its method of production, as well as a method for reading high density data have been realized.

Here, an information retrieval analyzer having an image processor 65 is capable of high fidelity reproduction of input data and assigns coloring of different colors to sections with different height in accordance with a structure on a processing substrate 6, and is capable of reproducing input data by outputting an output data 68 from a printer 67. Further, stored form can be reproduced at any magnification rate as observing magnification at a reading apparatus 50 can be set at any rate.

Embodiment 2

Figure 12:
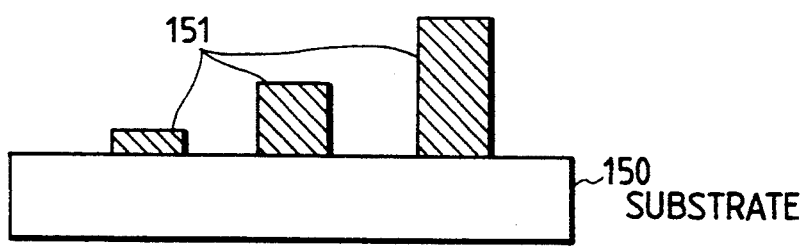
FIG. 12 is a diagram explaining a method of data storage using dry etching.
Figure 13:
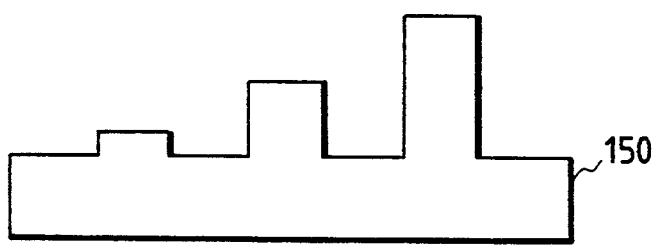
FIG. 13 is a diagram explaining a method of data storage using dry etching.

This embodiment explains a method wherein a resist pattern is used as an etching mask to transfer a pattern on a processing substrate. FIG. 12 and FIG. 13 describe this method. FIG. 12 shows a cross section form after developing. The pattern of a negative type electron beam resist 151 is formed on a substrate 150. A dry etching is performed on this structure inside CC14 plasma, for instance. At this point, RD-2000N (manufactured by Hitachi Chemical, Co., Ltd., a registered trademark), for instance, is used as a negative type electron beam resist. Since the dry etching selectivity between a negative type electron beam resist RD-2000N and silicon is 1 to 5, a negative type electron beam resist will be etching processed while silicon etching is being processed. For this reason, a difference in level was formed on a processing substrate 150 as shown in FIG. 13.

At this point, a processing substrate 6 whose developing or dry etching has been completed can be either advanced to the next processing or covered with vaporization film of a metal film using metal such as gold or with a publicly known organic resin to protect its surface. Storage of data was performed in this manner.

While a negative type electron beam resist coated on a 4 inch silicon wafer was used as a processing substrate 6 in the foregoing Embodiment 1 and Embodiment 2, it is sufficient to have data stored in at least one of the substrate components, which include a insulator, a semiconductor or an electric conductor. In other words, substrate material and data storage section are a combination of these components or are their equivalent. An insulator shall contain at least one of the following; organic resin such as resist and plastic, or glass including spin coatable glass. A silicon wafer can be substituted by an item silicon wafer on which an oxidized film or a nitrate film has grown. A semiconductor shall contain at least one of the following; germanium (which is a Group IV semiconductor like silicon) and its compounds, III-V Group semiconductor such as GaAs and its compounds and II-VI Group semiconductor such as ZnSe and its compound. A metal substrate such as aluminum and stainless steel is acceptable for electric conductor. These forms can be rectangular instead of circle as long as it can be loaded on a writing apparatus 4.

Further, while a case using a negative type electron beam resist was as described in the foregoing Embodiment 1 and Embodiment 2, it goes without saying that the same can be applied to a positive type electron beam resist. RE5000P (manufactured by Hitachi Chemical, Co., Ltd., a registered trademark), for instance, can be used for a positive type electron beam resist.

Furthermore, while a case using an electron beam was only described in the foregoing Embodiment 1 and Embodiment 2, it goes without saying that the same can be applied to X ray, visible light, ultraviolet ray or charged particles such as ion beam, or to gamma ray.

In the foregoing Embodiment 1 and Embodiment 2, data has formed steps with multiple level depth or height in predetermined plural areas on a substrate surface, with each depth or height independently corresponding on one-to-one basis with the predetermined information and room existing for arranging their positions on a substrate in a random manner. Accordingly, data can be stored at any position as there is no limit with regard to the position of data on a storage medium, where optical disk, for instance, has limitation.

As can be seen from the content stated above, a form of data explained in this embodiment is for reading only (ROM: Read Only Memory).

While the format of storage medium took the wafer form in the foregoing description, it goes without saying that the form is not limited to this, and any form can be assumed as long as it can be loaded on respective devices at the time of storing and reading data. For instance, such forms may include a form built into a card or a pendant, or a substrate itself can take the form of a card or a pendant.

Embodiment 3

A method wherein data has formed steps with multiple level depth or height in predetermined plural areas on a substrate surface, with each depth or height independently corresponding on one-to-one basis with the predetermined information and room existing for arranging their positions on a substrate in a random manner was explained in Embodiment 1 and Embodiment 2. An exactly similar approach can be taken in a condition where steps with "n" levels ("n" is 3 or greater) of depth or height in predetermined plural areas on a substrate surface, with each depth or height independently corresponding on one-to-one basis with the predetermined "n-value" data. The difference between this embodiment and Embodiment 1 and Embodiment 2 is that the position of data storage does not necessarily have to be random, and that it can be applied to optical disks, magnetic disks and magneto-optical disks. The data that has been stored can be accessed randomly.

Embodiment 4

This embodiment explains a method for storing and producing data.

A substrate or substrate surface, which includes a substrate and materials that are formed on a substrate, can be processed so that its steps with multiple level depth or height will independently correspond on one-to-one basis with the predetermined information. Although any number can be used here, 3 or more levels will be desirable.

Figure 2:
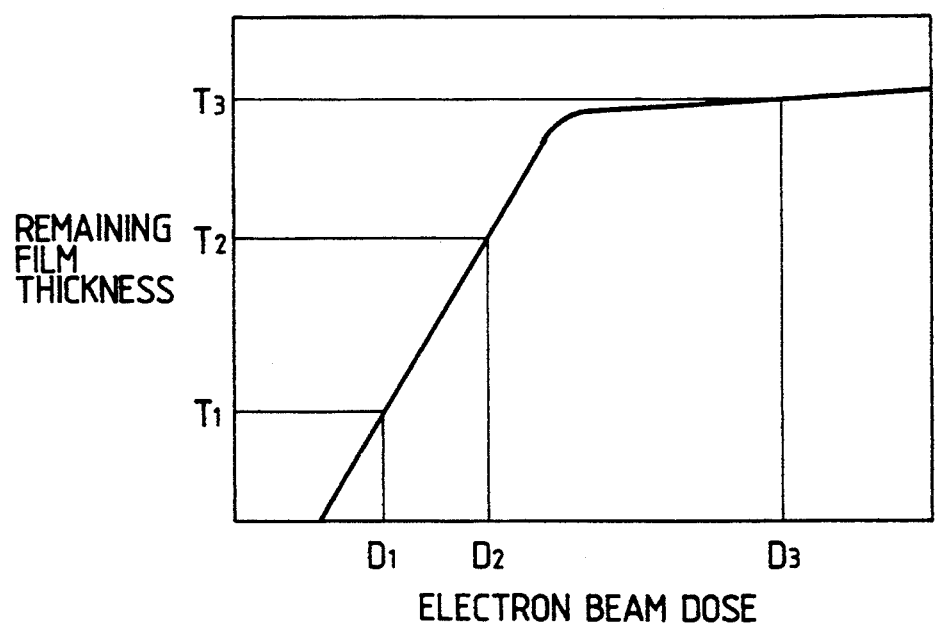
FIG. 2 is a sensitivity characteristic of a negative type electron beam resist.
Figure 7:
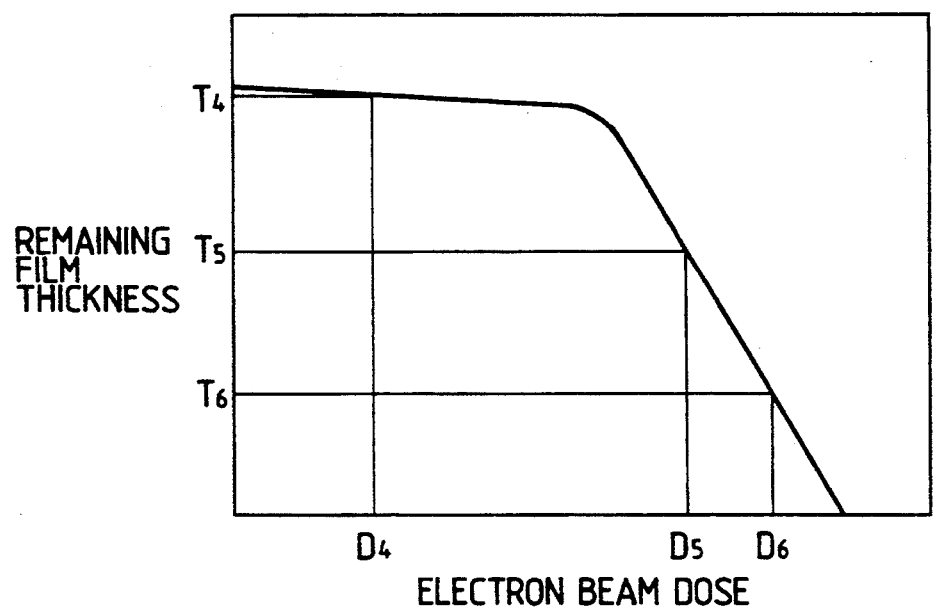
FIG. 7 is a sensitivity characteristic of a positive type electron beam resist.
Figure 3:
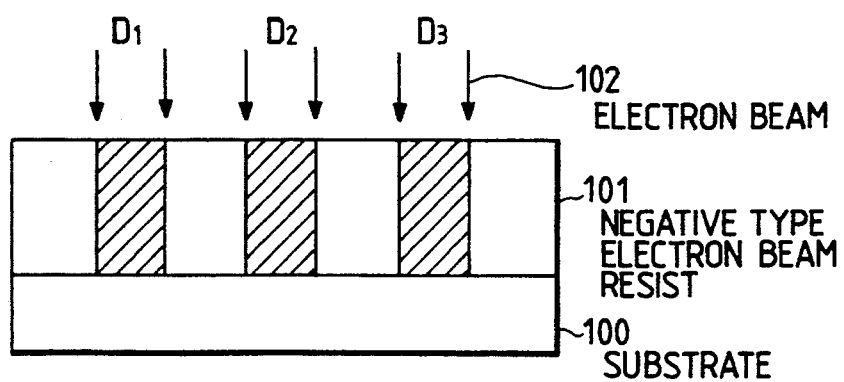
FIG. 3 is a diagram explaining a method of data storage.
Figure 4:
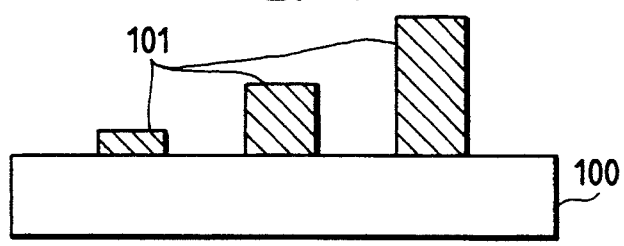
FIG. 4 is a diagram explaining a method of data storage.
Figure 5:
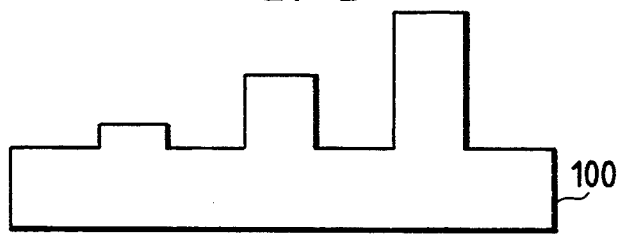
FIG. 5 is a diagram explaining a method of data storage.
Figure 6:
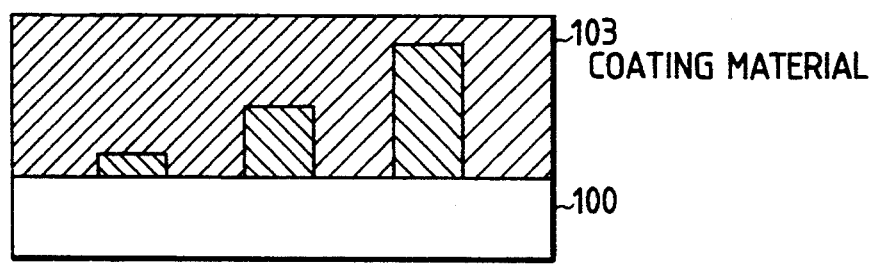
FIG. 6 is a diagram explaining a method of data storage.
Figure 8:
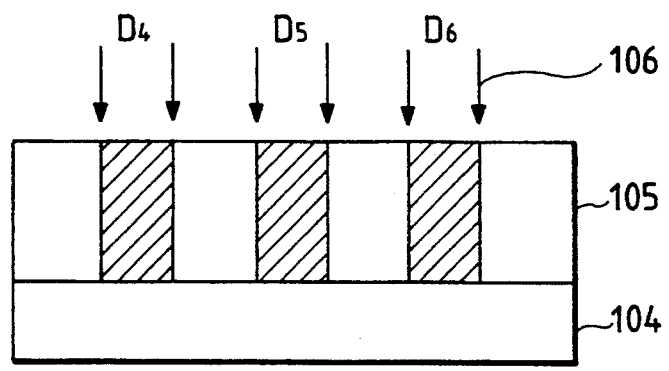
FIG. 8 is a diagram explaining a method of data storage.
Figure 9:
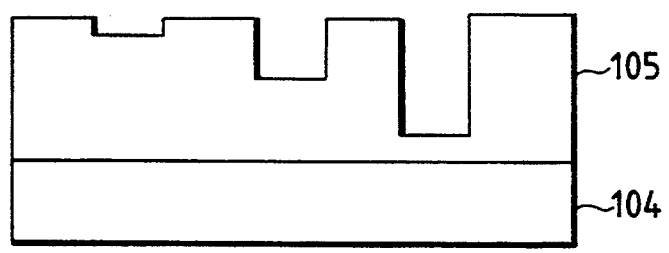
FIG. 9 is a diagram explaining a method of data storage.
Figure 10:
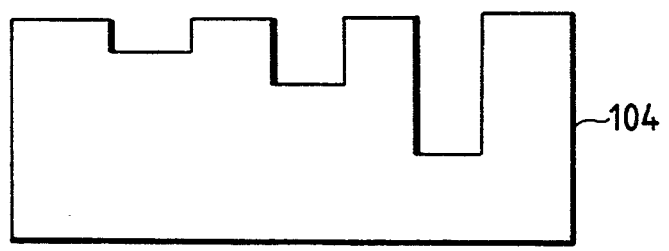
FIG. 10 is a diagram explaining a method of data storage.
Figure 11:
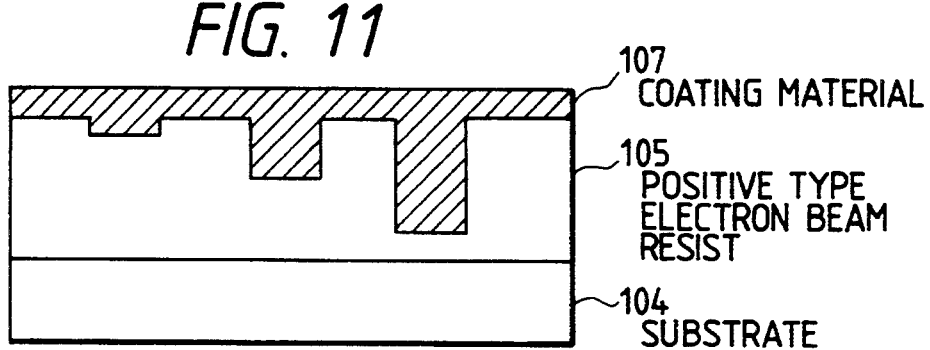
FIG. 11 is a diagram explaining a method of data storage.

Possible methods include a chemical processing method and a mechanical processing method. A chemical processing method, as stated above, is a method wherein an energy ray corresponding to data is irradiated on a material which has sensitivity against an energy ray placed on a substrate surface to form steps through etching during or after the developing. At this point, etching can process only the same material, or can be advanced up to a substrate to transfer the steps form on a substrate. In addition, steps form can be made conspicuous to facilitate reading by forming multiple layers of films with different etching characteristics on a substrate. Materials with sensitivity include resist, or spin coatable glass (SOG, spin-on glass) which has photosensitivity. Regarding material characteristic, unsaturated region or saturated region of sensitivity characteristic is used. In this embodiment, a saturated region refers to an area of sensitivity characteristic, in the case of electron beam, for instance, where characteristic change has disappeared due to high electron beam dose. In negative type, it is an area where the percentage of remaining film thickness became 100% against coated film thickness as shown in FIG. 2. In positive type, it is an area where the percentage of remaining film thickness became 0% against coated film thickness as shown in FIG. 7. Unsaturated region refers to portions other than such area.

At this point, charged particles such as ion beam and light, as well as X ray or gamma ray is used in addition to electron beam. An electron beam is excellent for fine processing as it can be narrowly focused. Light is easy to handle as it does not require vacuum and is most matured technologically. Charged particles such as ion beam is also excellent for fine processing as it can be focused as narrow as an electron beam, but has low processing speed because its large mass makes it impossible to take up large area for deflection. X ray or gamma ray is also excellent for fine processing because of its very straight movement.

On the other hand, a mechanical processing method refers to a method which directly processes a substrate surface. For instance, it is known that, by using a scanning tunneling electron microscope, it is possible to snatch away a surface atom or add a suspended matter in the environmental atmosphere by increasing the voltage impressed on an probe in a pulsive manner. By using this method, it is possible to create a difference in surface level on an atomic level, while adjusting the number of pulses impressed at a same point changed the depth or height of a substrate surface. Further, it is known that etching on a substrate surface or adding a substance on a substrate surface can also be done by using a focused ion beam. The use of this method has made it possible to change the depth or height of a substrate surface by adjusting the dose of ion beam.

Embodiment 5

This embodiment explains a method for reading data.

By using an electron beam, it was possible to read data on a storage medium which includes steps with multiple level depth or height formed in predetermined plural areas on a substrate surface, with each depth or height independently corresponding on one-to-one basis with the predetermined information as well as data on a storage medium which includes "n" levels ("n" is 3 or greater) of depth or height formed in predetermined plural areas on a substrate surface, with each depth or height independently corresponding on one-to-one basis with the predetermined "n-value" data. In addition to an electron beam, it was possible to use charged particles such as ion beam and light, as well as X ray or gamma ray.

The formation of steps on a substrate surface through the use of a scanning tunneling electron microscope was described in Embodiment 4. While a scanning electron beam microscope with ultrahigh resolution can be used for detection since steps are of atomic proportions, surface steps were detected by using a scanning tunneling electron microscope as was done during data storage. As for the insulation material, a clear reading signal was obtained by using an atomic force microscope because the sensitivity of scanning tunneling electron microscope was insufficient.

Embodiment 6

This embodiment explains a method for copying the storage media described in the foregoing Embodiment 1 through Embodiment 3.

The complex procedure stated above will have to taken in order to form a storage medium which includes steps with multiple level depth or height formed in predetermined plural areas on a substrate surface, with each depth or height independently corresponding on one-to-one basis with the predetermined information arranged randomly on the substrate surface, as well as a storage medium which includes "n" levels ("n" is 3 or greater) of depth or height formed in predetermined plural areas on a substrate surface, with each depth or height independently corresponding on one-to-one basis with the predetermined "n-value" data.

Accordingly, it is necessary to adopt an alternative method when producing storage media with identical content in large quantity. Copying a large quantity of an identical item became possible by inserting an original edition of storage medium into a stamper which is used in an ordinary optical disk when the original edition is created.

Embodiment 7

This embodiment explains the storage media explained in the foregoing Embodiment 1 through Embodiment 5 and a system using data storage and reading methods.

Figure 14:
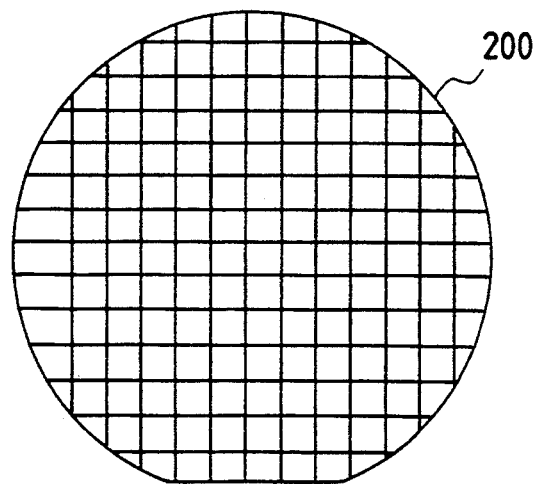
FIG. 14 is a processing substrate after a data storage.
Figure 15:
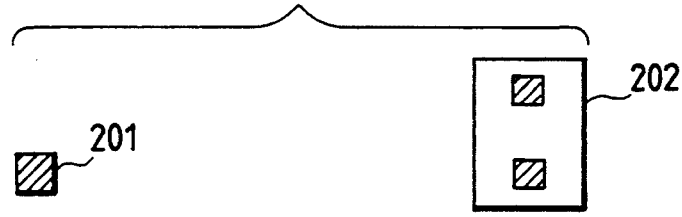
FIG. 15 is a chip or a card.

FIG. 14 is a processing substrate 200 after data is stored. In this diagram, one grid corresponds to the unit of input data. While it can be used as it is, it can also be transformed into a smaller unit chip 201 by cutting it out as shown in FIG. 15 or be made it easier to carry and store by inserting one or more of a chip 201 that was cut out into small pieces made of organic resin to make a card 202. It can also be inserted into a pendant. Then, stored data can be read by installing these chips 201 or cards 202 on the reading apparatus described in Embodiment 1. At this point, a stage 56 can be omitted because the area where data is stored becomes smaller in scale and the area can be confined to the deflection area of an electron beam 51. In addition, the entire reading apparatus can be made compact by using a fine electric field emitter. As a result, the embodiment can be used as a portable terminal.

An example wherein a processing substrate 200 was cut out and turned into a card 202 after data storage so that it can be installed on a reading apparatus and removed will be explained in the following. However, it goes without saying that the same is true for an unmodified processing substrate 200 as well as for substrates in the form of a chip 201 or a pendant.

Figure 16:
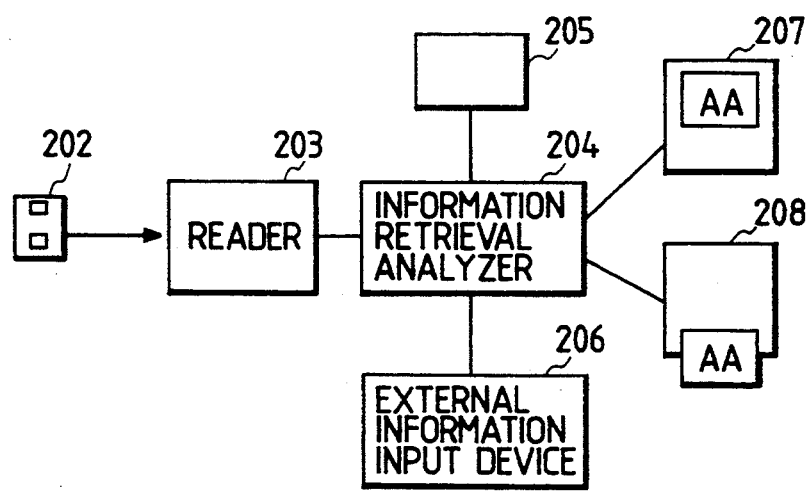
FIG. 16 is a method of reading following a data storage.

As dictionary data, map data, illness diagnosis data, legal data and name data are stored inside a card 202, a user will input data by installing it on a reading apparatus 203 as shown in FIG. 16. The data that has been input is analyzed at an information retrieval analyzer 204. A voice recognition input-output apparatus 205 or an external information input device 206 such as antenna can be installed on an information retrieval analyzer 204 to facilitate data retrieval and analysis. In addition, a monitor 207 is installed on an information retrieval analyzer 204 to obtain necessary data and a printer 208 can be used to print out the data. This has enabled simple storage and reading of a large volume of data.

Further, an information retrieval analyzer 204 can be connected to a drive system (not shown in the diagram) to control the drive of an automobile based on the retrieved and analyzed data.

Embodiment 8

Figure 17:
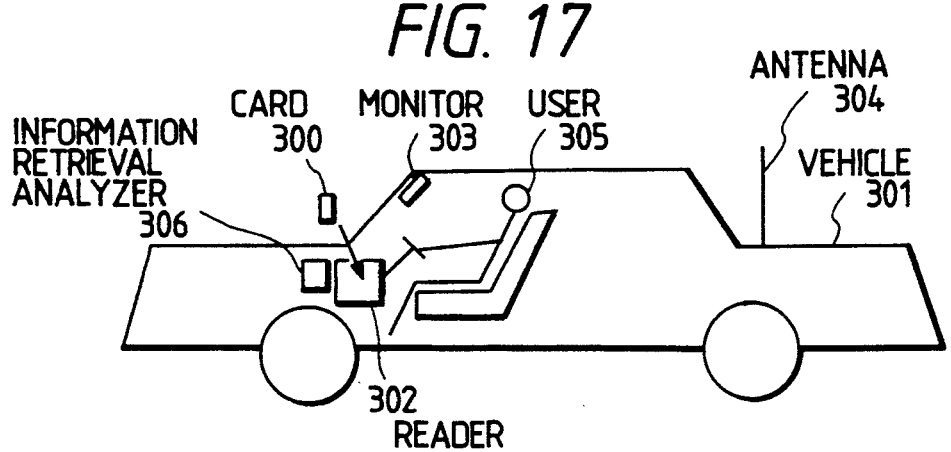
FIG. 17 is a diagram explaining an automobile navigation system.
Figure 18:
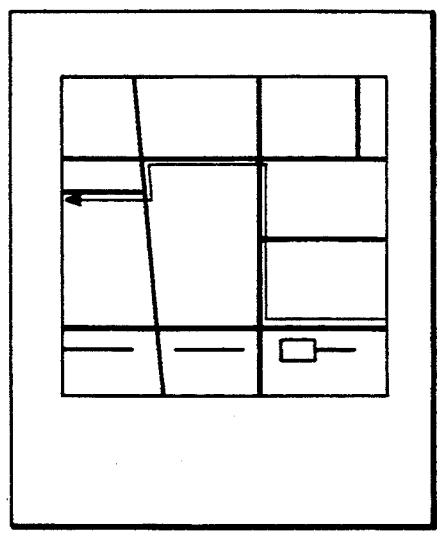
FIG. 18 is a reproduction diagram of map data.

This embodiment explains the navigation system concerning the present invention by using FIG. 17 and FIG. 18. As shown in FIG. 17, a card 300 on which map data is stored is installed on a reading apparatus 302 which is equipped on an automobile 301. As shown in FIG. 18, map data is reproduced on a monitor 303. At this point, an antenna 304 is installed on an automobile 301 to receive data on the current position and current congestion. The current position and current congestion are shown on a monitor 303 according to this data so that a driver 305 himself can select the optimum route from that point onward. In addition, an information retrieval analyzer 306 installed on an automobile 301 can be used to input the destination using a light pen to have the optimum route output. Further, automatic driving was realized by connecting to the drive system. An automobile navigation system was realized in the above manner.

Embodiment 9

Figure 19:
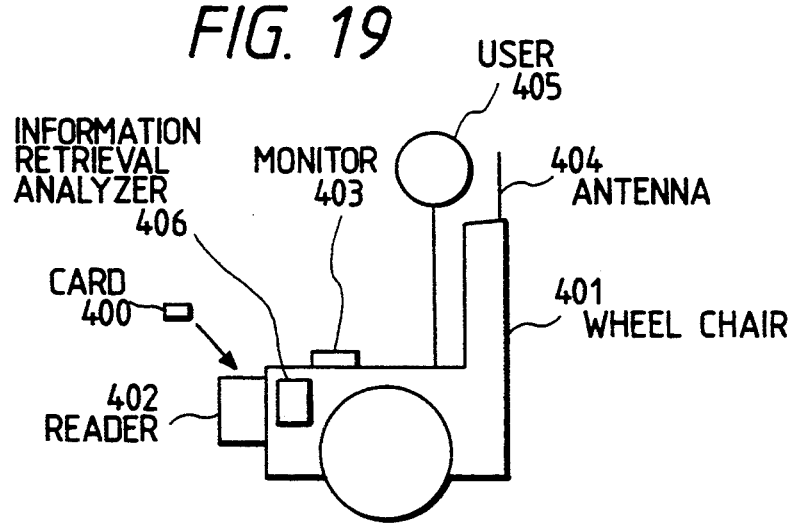
FIG. 19 is a diagram explaining a safety operation system for wheelchair.
Figure 20:
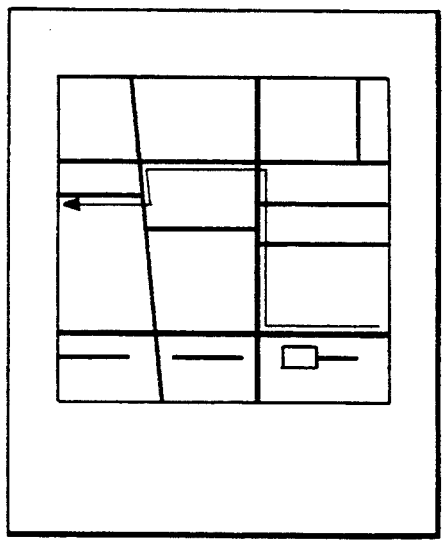
FIG. 20 is a reproduction diagram of map data.

This embodiment explains the safe wheelchair running system concerning the present invention by using FIG. 19 and FIG. 20. As shown in FIG. 19, a card 400 storing map data is installed on a reading apparatus 402 which is installed on a wheelchair 401. As shown in FIG. 20, map data is reproduced on a monitor 403. At this point, an antenna 404 is installed on a wheelchair 401 to receive data on the current position. The current position is shown on a monitor 403 according to this data so that a user 405 himself can select the optimum route from that point onward. In addition, an information retrieval analyzer 406 installed on a wheelchair 401 can be used to input the destination using a light pen to have the optimum route output. Further, automatic transport can be realized by building a motor into a wheelchair 401. A safe wheelchair running system was realized in this manner.

Embodiment 10

Figure 21:
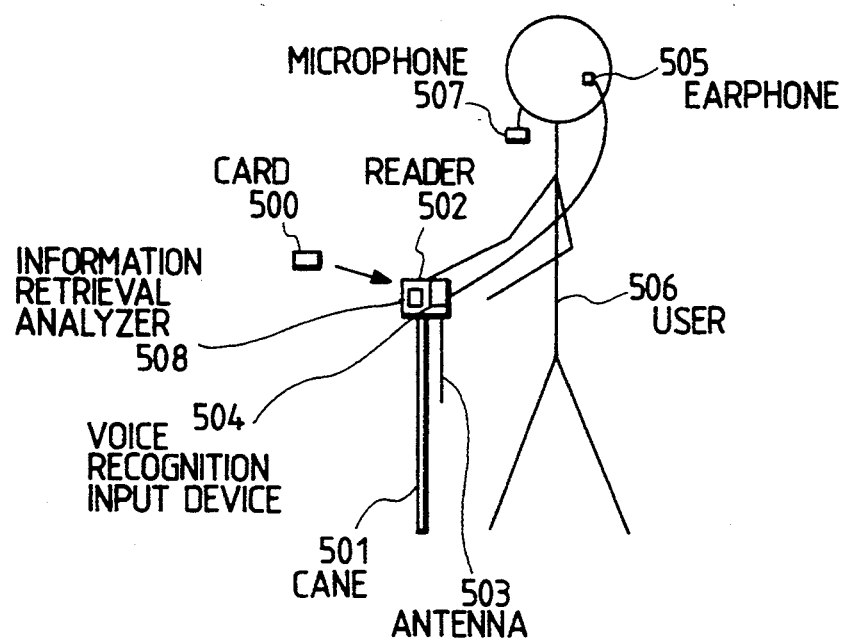
FIG. 21 a diagram explaining a safe walking system for people with visual disabilities.

This embodiment explains the safe walking system for people with visual disabilities concerning the present invention by using FIG. 21. As shown in FIG. 21, a card 500 storing map data is installed on a reading apparatus 502 which is installed on a cane 501. At this point, an antenna 503 is installed on a cane 501 to receive data on the current position. Position data is conveyed to a user 506 from a voice recognition input device 504 via an earphone 505. In addition, an user 506 provides the destination to a voice recognition input device 504 via a microphone 507. This data is judged by an information retrieval analyzer 508 and compared with the map data obtained from a reading apparatus 502 to select the optimum route. The result is again conveyed to a user 505 from a voice recognition input device 504 via an earphone 505. At this point, instruction on direction of movement are constantly given to a user 506 by referring to the current position data obtained from an antenna 503. A safe walking system for people with visual disabilities was realized in this manner.

While radio wave, light pen and voice data were used as data necessary at the time of reading in the foregoing embodiment, it goes without saying that a similar effect can also be obtained by using keyboard, handwritten characters and communication data from other devices. In addition, while pictures and characters that were output to monitor, sound and printer as well as command signal data for a drive system were used as output data for reading information, it goes without saying that a similar effect can also be obtained by using transmission signal, writing signal for memory device such as magnetic, optical and magneto-optical disks and a new input pattern used on the present invention.

Embodiment 11

Figure 22:
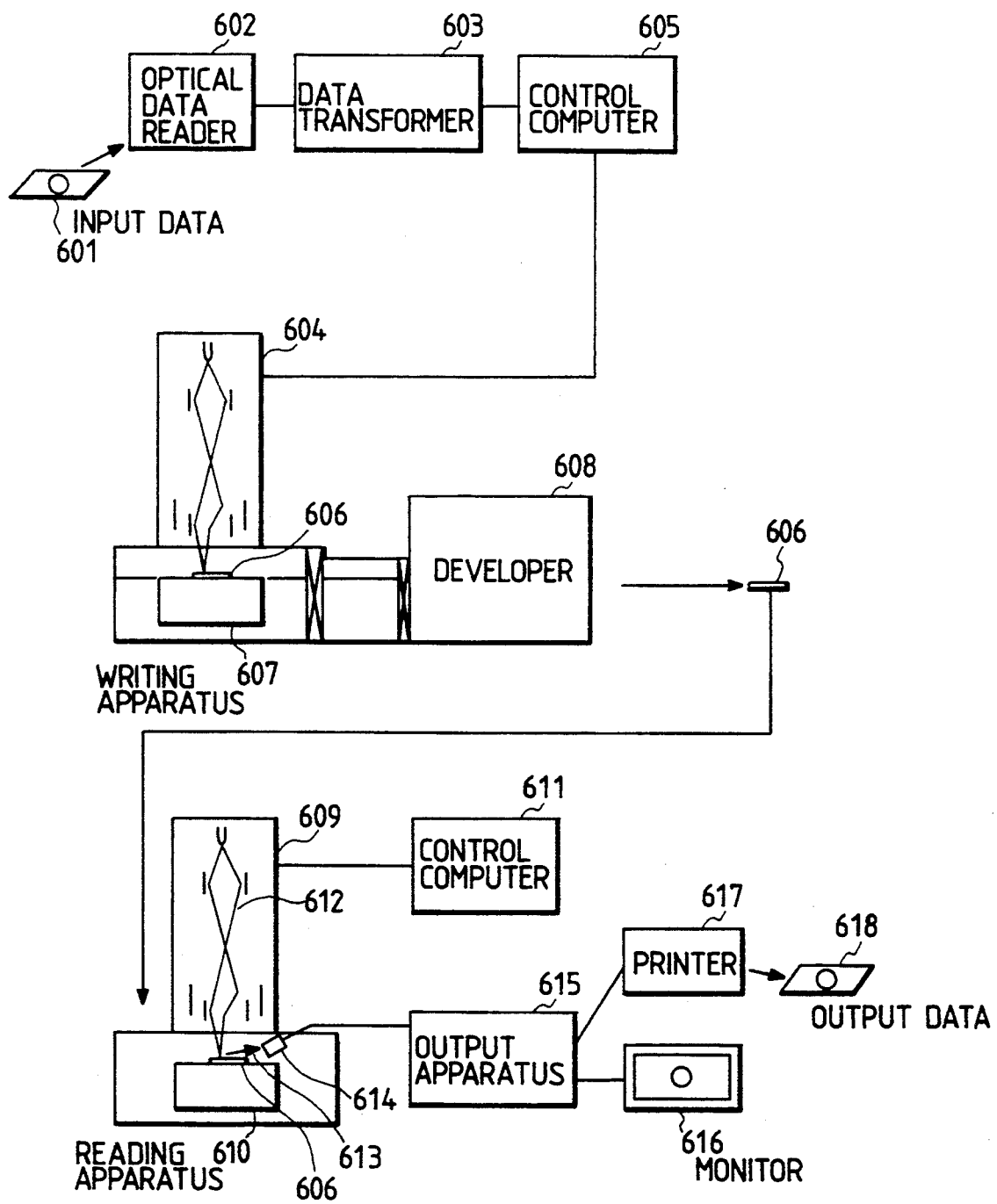
FIG. 22 is a structural diagram for a large capacity filing system.

A structural diagram of a large capacity filing system concerning the present invention will be explained by using FIG. 22. The first explanation will be on storing of data. An input screen 601 for documents, maps and patterns is read by using an optical data reader 602 to create digital data. Then compression and coding of data is performed by a data transformer 603, creating input data which is compatible with an electron beam drawing device. At this point, a data transformer possesses editing functions such as data correction and merging, and input data is edited in an interactive manner. At this time, input data contains a drawing pattern and electron beam dose. Then retrieving information including those concerning the content of storage for keyword, page and document name of input data and those concerning the position in the medium that draws the input data are provided for every unit of input data. The position in the medium can be provided by the recorder or can be provided automatically. This retrieving information facilitates reading of stored data by drawing along with a drawing pattern at the time of subsequent electron beam drawing. In this manner, data is stored in a storage medium at a writing apparatus 604, whose original form is an electron beam drawing device, after an input data has been created. A writing apparatus 604 is controlled by a control computer 605. In this embodiment, a silicon wafer 606 with 4 inch diameter was used as storage medium substrate. However, the substrate material is not limited to silicon, and it goes without saying that other semiconductor substrate, insulator substrate or conductive substrate such as metal is also acceptable and that its size is not limited to 4 inches.

Figure 23:
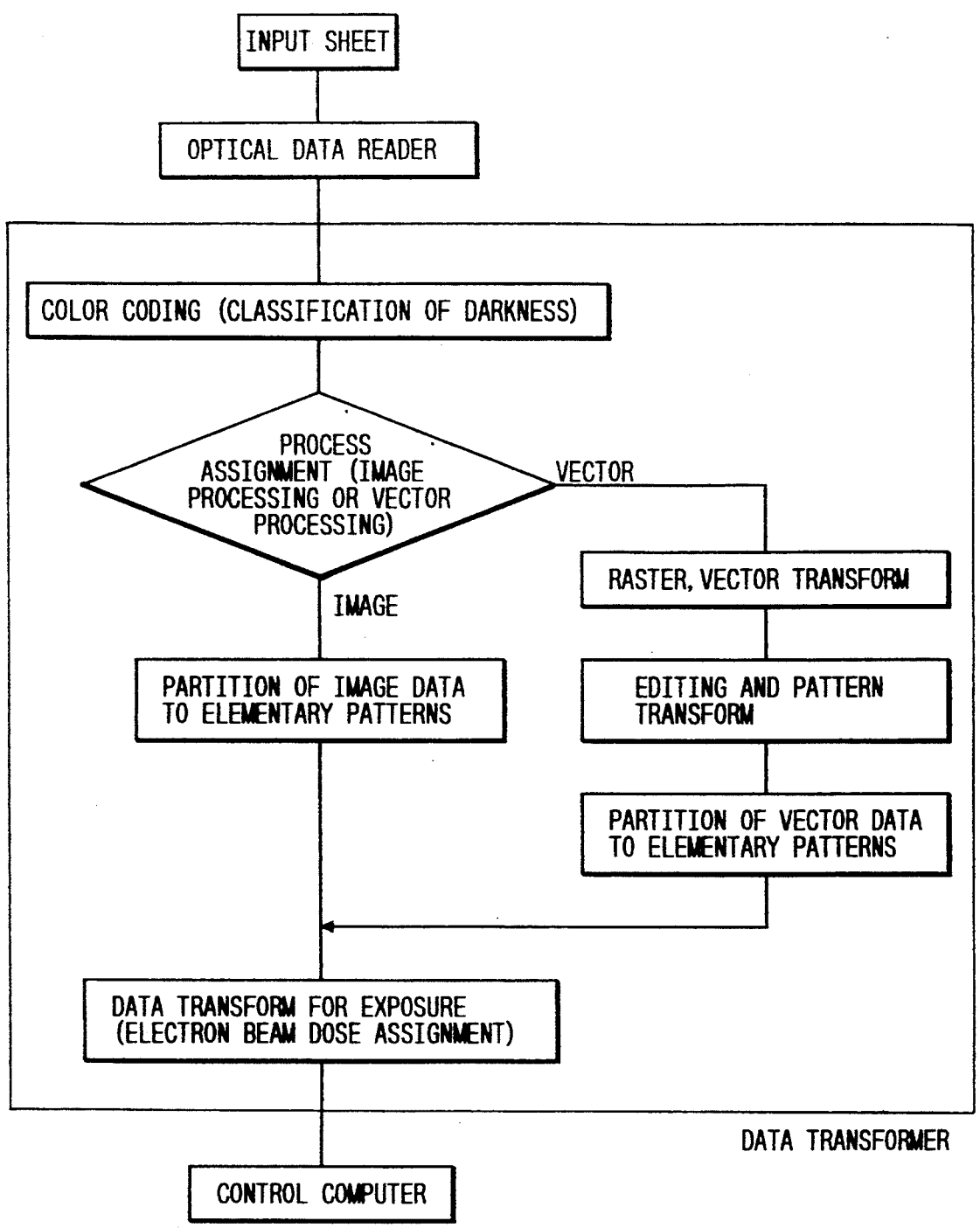
FIG. 23 is a diagram explaining the flow of data from an input sheet to input data for electron beam drawing.

At this point, the flow of data from an input pattern to creation of input data for electron beam drawing is explained by using FIG. 23. Input sheet is read by an optical data reading apparatus (scanner) to generate digital data, which, in turn, is sent to a data transformer. At a data transformer, color coding including classification of darkness is performed to identify the color of an input screen and its darkness. Then a display installed on a data transformer is used to divide into specific areas, assigning whether to process each area as image data which is a mere congregate of points or as vector data which is expressed by starting point, direction and length. In the case of the former, although any pattern can be written, editing such as addition of a pattern and pattern transformation such as rotation and magnification cannot be performed. Meanwhile, in the case of the latter, pattern transformation can be performed even though patterns that can be written is limited. For this reason, it is necessary to specify the type of data depending on the purpose of input screen in question. Following the specification of the foregoing, partition of data in areas that have been assigned as image data into elementary patterns such as rectangles that are permitted in electron beam writing. Meanwhile, in areas that have been assigned as vector data, partition of vector data into elementary patterns is performed as in image data after processing such as rastor-vector transformation, editing and pattern transformation are completed for introduction of vector. Then data is sent to the control computer of a writing apparatus after the two post-element partition patterns are merged and format transformation to electron beam drawing data is performed. The height on the completed storage medium can be changed by specifying an electron beam dose for each drawing pattern. The assigned value can be the standard value which is given to a data transformer in advance, or can be assigned by the user according to necessity by checking the input data.

As an actual storage procedure, a silicon wafer with a negative type electron beam resist coated in thickness of 100 nanometer, for instance, is put inside a writing apparatus 604 to draw input data in an area on a silicon wafer 606. At this point, the foregoing retrieving information is drawn on another specific area. Further, although a drawing pattern is drawn at the previously assigned location, drawing is started after a stage 607 carrying a silicon wafer 606 moves for drawing at the assigned position because deflection area of electron beam is generally smaller than a silicon wafer 606. Data is written by performing this procedure for all input data. Then a wafer is developed at a developer 608 which is attached to a wafer writing apparatus 604 to form a resist pattern and complete the storage of final data. At this point, it goes without saying that a resist is not limited to negative type, and that positive type is also acceptable. In addition, a pattern can be transferred to a substrate by dry etching after a resist pattern is formed. Further, a protection film can be put on a substrate after a pattern is formed to protect a pattern. At this point, aside from storing in a silicon wafer 606, retrieving information of input data can be stored in an external storage device such as magnetic disk which is attached to a control computer 605.

The next explanation is on reading of data. A silicon wafer 606, which is a storage medium containing stored data is installed on a reading apparatus 609 whose original form is an electronic microscope. A silicon wafer 606 is also put on a movable stage 610. By inputting a keyword for data to be read into a control computer 611, an electron beam 612 will scan the area where retrieving information is stored, a reflection electron or a secondary electron 613 is detected by a semiconductor detector 614, and the retrieving information section related to the keyword that was input in advance is judged according to pattern recognition and is displayed on the screen. A user will judge this and moves on to the next step if it is correct. A reading apparatus 609 detects a position of retrieving information on a silicon wafer 606, and a stage automatically moves to that position. Then an electron beam 612 scans its peripheral area to detect a reflection electron or a secondary electron 613 which is emitted from a storage medium by a semiconductor detector 614 so that a user can read data by displaying this on a monitor 616 which is attached to an output apparatus 615. An image processing device is installed inside an output apparatus 615 to enable processing of a reflection electron or a secondary electron 613. For instance, data that has been stored by changing its height in a storage medium can add colors to data at respective height through image processing owing to the difference in intensity of a reflection electron or a secondary electron. Here, a printer 617 is added to an output apparatus 615 and can print out the content of data that has been read to provide an output data 618.

Figure 24:
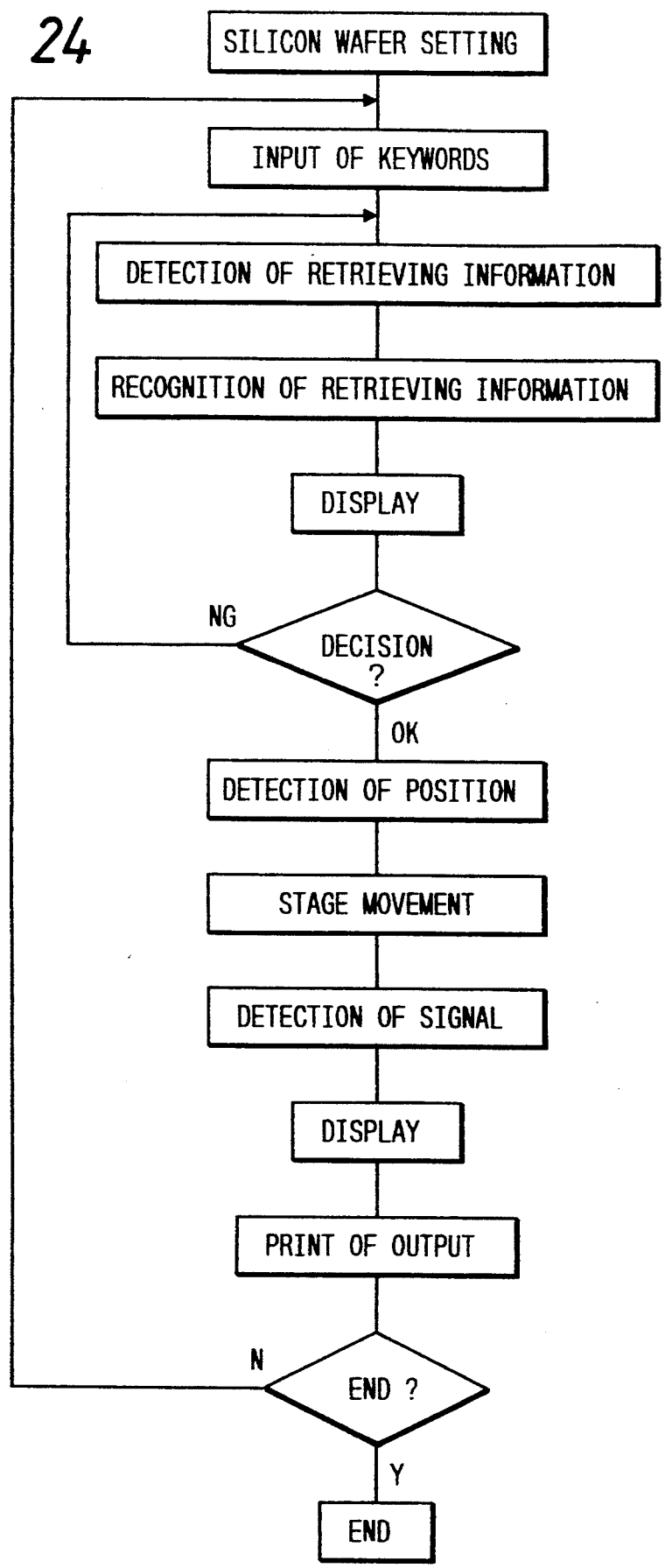
FIG. 24 is a diagram explaining the flow of data from silicon wafer to output data.

At this point, the flow of data from silicon wafer, which is a storage medium, to creation of output data is explained by using FIG. 24. A silicon wafer is set and a keyword for data to be read is input in a control computer. Then an electron beam scans a retrieving information on which the position of data storage position is stored to detect a reflection electron or a secondary electron emitted from it by a semiconductor to take in the retrieving information. Then the retrieving information section related to the keyword that was input in advance is judged according to pattern recognition and is displayed on the screen. A user will judge this and moves on to the next step if it is correct. A reading apparatus detects a position a silicon wafer according to the data storage position that has been obtained and moves a stage to that position. Then an electron beam scans its assigned area to detect a reflection electron or a secondary electron which is emitted from a storage medium by a semiconductor detector to take in a detection signal. This detected signal is sent to an output apparatus, and a user can read data after image processing by displaying this on an attached monitor. Here, a printer is added to an output apparatus and can print out the content of data that has been read to provide an output data. Thus, plural data can be read by repeating the procedure from input of keyword.

The foregoing data transformer and control computer contains at least a memory for storing CPU and a program and realize the foregoing processing flow through software.

Then storing and reading the content of original thesis are shown as an application of the present invention. The original thesis to be stored is read by an optical data reading apparatus 602 to create a digital data of the content of thesis, and retrieving information is given simultaneously at this time. For instance, keywords could represent thesis title, author, affiliated organization, name of thesis journal, page and thesis content. Then data is compressed and encoded by a data transformer 603 to create an input data compatible with an electron beam drawing device. At this point, it becomes possible to perform data editing such as correction and merging, and the input data will be edited in an interactive manner. At this time, the input data includes the drawing pattern and electron beam dose that are to be stored. For instance, electron beam dose is changed according to the color of the thesis paper. This will make it possible to change the height of the completed resist pattern and increase the data storage volume. Then, as stated above, retrieving information including those concerning the stored content such as keyword, page and document name and those concerning the position in the medium that draws the input data will be given to each unit of input data. Those concerning the position can be given automatically. In this manner, information is stored in a storage medium at a writing apparatus 604 whose original form is an electron beam drawing device. In this embodiment, a silicon wafer 606 with 4 inch diameter was used as storage medium substrate. A silicon wafer with a negative type electron beam resist coated in thickness of 100 nanometer, for instance, is put inside a writing apparatus 604 to draw input data in an area on a silicon wafer 606. Then the foregoing retrieving information is drawn on another specific area.

Figure 25:
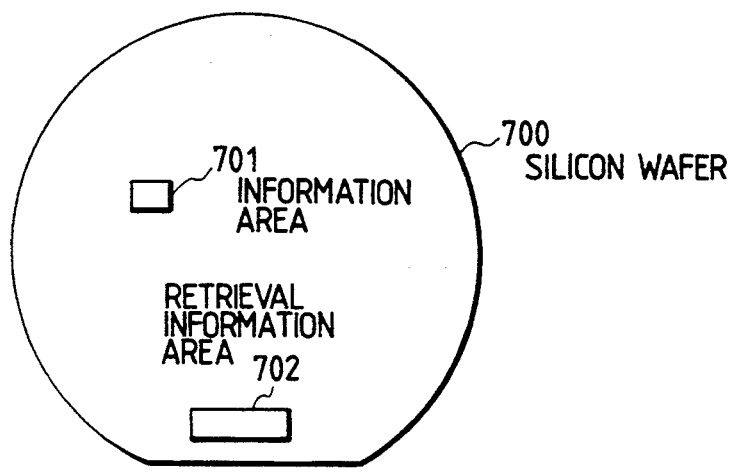
FIG. 25 is a diagram explaining a method of data storage on a wafer.

This will be explained by using FIG. 25. FIG. 25 is a diagram of a silicon wafer seen from above. Predetermined information is stored at a specific information area 701 on a silicon wafer 700. Then the retrieving information concerning this information will be stored in a specific retrieving information area 702. At this point, retrieving information can be stored altogether at one place or can be stored in plural locations.

Meanwhile, a drawing pattern is drawn at a previously assigned area, but since the deflection area of an electron beam is generally smaller than a silicon wafer 606, drawing starts after a stage 607 carrying a silicon wafer 606 moves for drawing at an assigned position. Data writing is performed by following this procedure for all input data. Then a wafer is developed at a developer 608 which is attached to a writing apparatus 604 to complete the final storage of input data. At this point, retrieving information for input data can be stored in an external storage device such as magnetic disk which is attached to a control computer 605 along with a silicon wafer 606. Since the volume of data that can be stored on a 4 inch silicon wafer is large as stated above, it is desirable to use the foregoing storage for storing many original theses at one time and is perfect for creating a database, for instance.

The next explanation concerns reading of information. A silicon wafer 606 which is a storage medium containing stored data is loaded on a reading apparatus 609 whose original form is an electronic microscope. A silicon wafer 606 is placed on a movable stage 610 here as well. By inputting information concerning a thesis that needs to be read, e.g. keyword such as its title or author, into a control computer 610, an electron beam 612 scans through the area where the retrieving information is stored, detects the pattern of a reflecting electron or secondary electron 613 which is emitted from the area and the retrieving information section related to the keyword that has been inputted earlier is judged by pattern recognition and displayed on the screen. A user judges this and proceeds to the next step if it is correct. A reading apparatus 609 detects the position where data is stored on a silicon wafer 606 in the retrieving information and a stage 610 moves to that position. Then an electron beam 612 scans through that specified area, detects the pattern of a reflecting electron or secondary electron 613 which is emitted from the area with a semiconductor detector 614 and makes it possible for the user to read the information by displaying it on a monitor 616 which is attached to an output apparatus 615. At this point, the data that has been stored at different height in a storage medium can have this difference output in different colors through image processing as the intensity of reflecting electron or secondary electron will be different at the time of reading. At this point, a printer 617 is attached to an output apparatus 615 to print out the content of information that has been read and produce an output data 618.

In addition, compactization of the entire system was achieved by using a fine electric field emitter as a source of generating the foregoing electron beam.

While the case of an electron beam was described in the foregoing embodiment as a method of writing and reading stored data, similar results were obtained by using charged particles such as ion beam and light, X ray, gamma ray, scanning tunneling electron microscope or atomic force microscope to write or read stored data.

While explanation was made using documents such as original thesis in this embodiment, the content of storage is not limited to this, and can be documents such as dictionary data, illness diagnosis data, legal data and name data or image data such as map or photograph. In addition, handwritten documents such as resident registration ledger or results of statistical response can be used as input data. In such a case, a form of input-output apparatus corresponding to each data can be used. For instance, using an image will require an optical reading apparatus with improved resolution and a high resolution printer, while a handwritten document will require an addition of a device capable of pattern recognition to an optical scanner at the time of input.

Embodiment 12

A method of arranging storage device and reading apparatus concerning the present invention will be explained. A general storage device is used for storing a large volume of data in bulk. For this reason, it is efficient to perform storage in one location when creating more than one data which is identical in content and to read the storage medium that has been completed through reading apparatuses that are installed at several locations. For instance, when database such as document is prepared by this method, data can be used freely by owning a reading apparatus. For this reason, database can be used without using an expensive data circuit. As storage medium is compact and portable, it can be stored and used with the convenience of a floppy disk which is normally used.

At this point, the volume of database created was increased by copying with a stareper which is used at the time of producing an ordinary optical disk.

Embodiment 13

Figure 26:
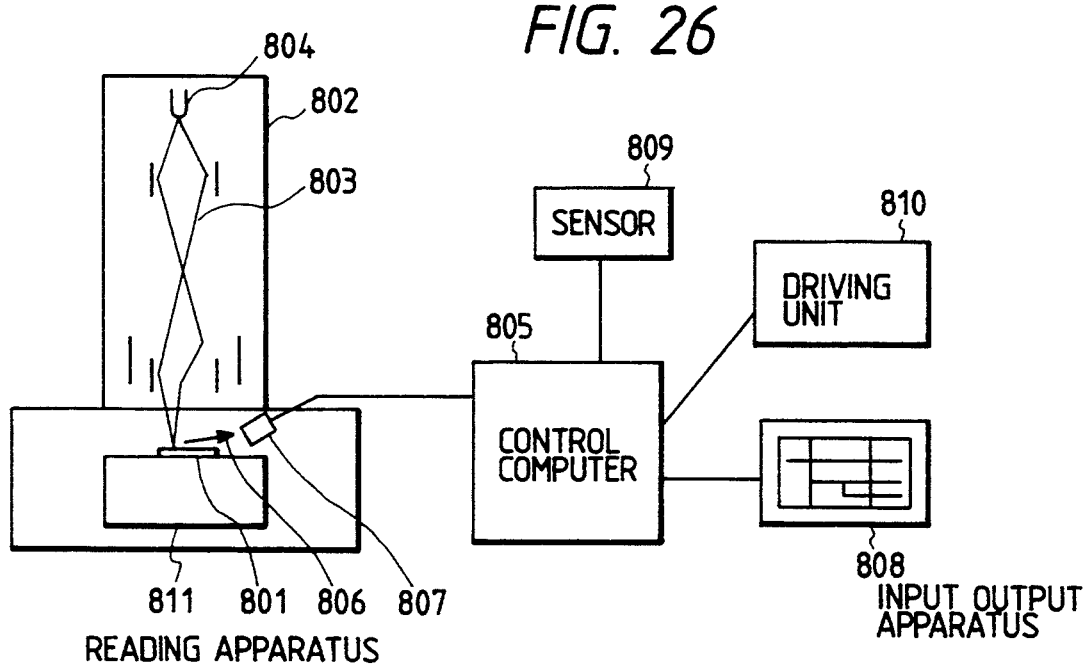
FIG. 26 is a diagram explaining a navigation system.

An diagram explaining a navigation system concerning the present invention is shown in FIG. 26. In this embodiment, a case where a mobile unit is driven by using an electron beam for reading data will be explained. A storage medium 801 containing stored data is loaded on a reading apparatus 802 whose original form is an electronic microscope. An electron beam 803 is generated from an electron source 804 and is irradiated on a storage medium 801 after being narrowly focused by going through several apertures and lenses. At this point, acceleration voltage of an electron beam was set to 5 kV, but it goes without saying that the value is not limited to this value. An electron beam 803 is scanned according to command from a control computer 805 and is irradiated on a predetermined area on a storage medium 801. A reflecting electron or secondary electron 806 is generated from a storage medium 801 as a result of this irradiation. This is detected by a semiconductor detector 807, and its signal is sent to a control computer 805. An image processing device is built into a control computer 805 to process signals such as reflecting electron or secondary electron. For instance, data that has been stored at different height in a storage medium can have color allotted to data at each height through image processing due to difference in the intensity of reflecting electron or secondary electron. This will be displayed on the monitor of an input-output apparatus 808. Meanwhile, a sensor 809 is connected to a control computer 805 to detect signals from outside. Signals from outside include radio wave from radio wave sources that have been installed at various street points and radio wave from satellites. These signals transmit data on topographic configuration and altitude as well as data on traffic light. Further, the mobile unit itself is transmitting signals such as microwave and detects a reflection wave from objects in the periphery of the mobile unit with a sensor 809, thereby grasping the positional relation with vehicles and people that are near the mobile unit. A diagram recognition device for comparing and judging the stored data sent from a semiconductor detector 807 and topographic data obtained from a sensor 809 is installed inside a control computer 805 to judge the present position of the mobile unit by comparing the two. Then the position of the mobile unit is displayed on the monitor of an input-output apparatus 808. In addition, by inputting the target location of the mobile unit into the monitor of an input-output apparatus 808 by using a pen light or a mouse, a control computer 805 will select the most appropriate route and drives the mobile unit by giving instructions on the driving direction or by controlling a driving unit 810. Safety during driving is secured by detecting the signal from a sensor 809 at all times to compare with the stored map data and confirming the current position of the mobile unit.

Although the foregoing description assumes that a storage medium 801 is fixed, it can also be put on a movable stage 811 to assign the scanning area of an electron beam 803. Moving a stage 811 carrying an electron beam storage medium 801 will enlarge the effective scanning range of an electron beam to make detection possible in a wider range. For instance, let us assume that map data of a certain area is stored in a range of one scanning area which is permitted within a reading apparatus and that plural areas are stored in a storage medium 801. Detection of an area which is different from the one that is being detected at present can be done by moving the stage to move the predetermined section inside the scanning area of an electron beam 803. Application of this system to a broad range of areas becomes possible by detecting plural areas in this manner. Further, scanning area of an electron beam is not something that is fixed and can be selected at will according to the detecting precision that is required. In such a case, detection of plural areas becomes possible without necessarily accompanying stage movement.

Figure 27:
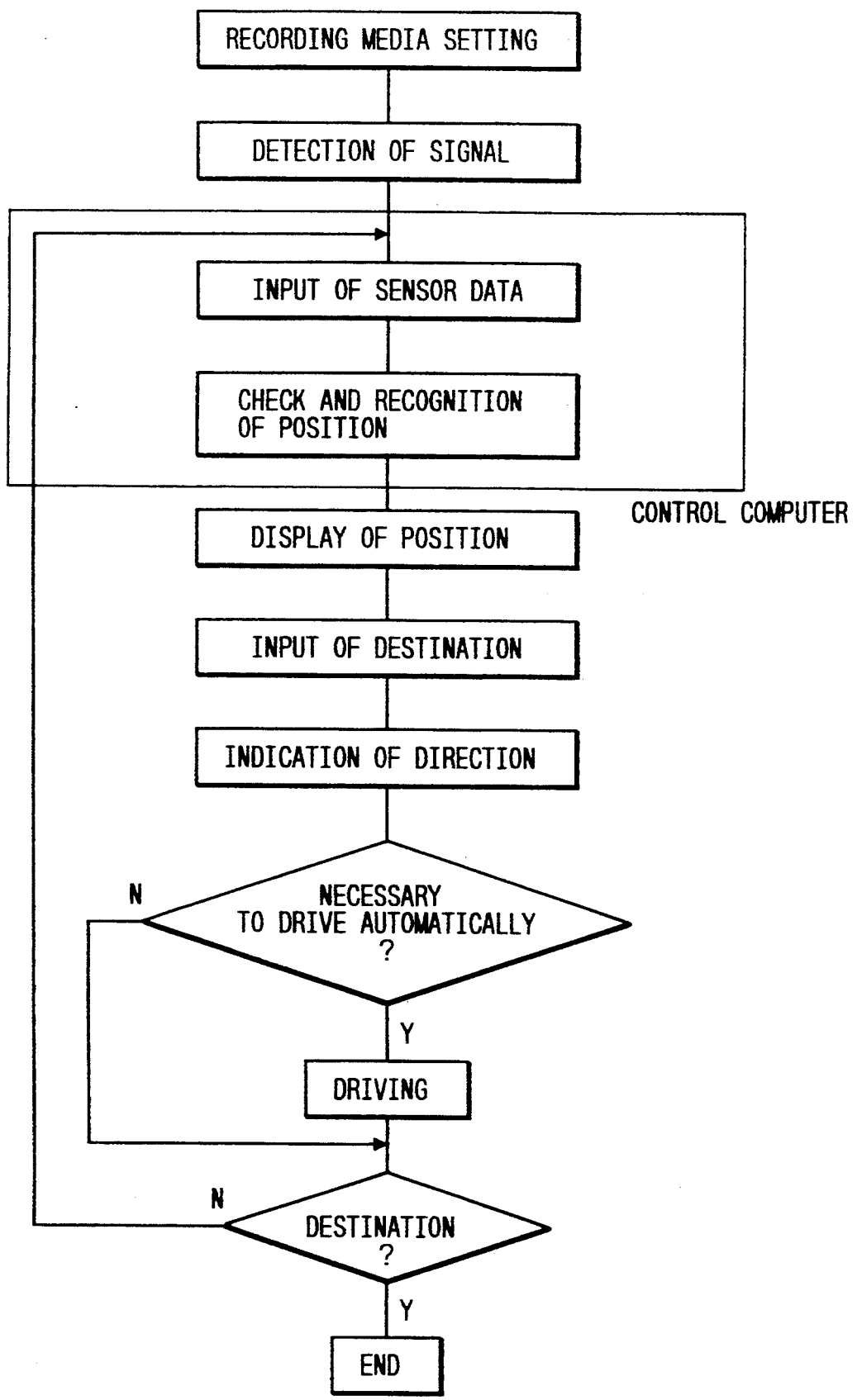
FIG. 27 is a diagram explaining the flow of data from a storage medium to a display of mobile unit position or a drive.

The flow of data from a storage medium to display of a mobile unit position or drive is hereby explained using FIG. 27. After setting the storage medium, an electron beam scans the storage medium and detects the reflecting electron or secondary electron which is generated from there with a semiconductor detector, taking in a detection signal and sending it to the control computer. The control computer, in turn, takes in sensor data concerning position data from the sensor. Then a comparison of detected signal and sensor data and position judgment are performed through diagram recognition processing inside the control computer. The present position obtained as a result is displayed on the attached monitor overlapped with geographical data of the vicinity. Instructions on driving direction for reaching the destination that has been input in advance can be given in addition to the display of the present position. In addition, a mobile unit can be driven by sending a control signal from the control computer to the driving unit when automatic control of the mobile unit is necessary. At this point, a printer is attached to the output apparatus to print out the content of data that has been read and provide an output data. The control computer has taken in sensor data to perform comparison with detection signal from the storage medium and position judgment at all times. In addition, the stage can be moved automatically or by instruction from the user to read regional data on a prescribed area if data on plural areas is stored in the storage medium and after leaving the reference area for comparison with sensor data. The procedure stated above shall be taken until reaching the destination.

Figure 28:
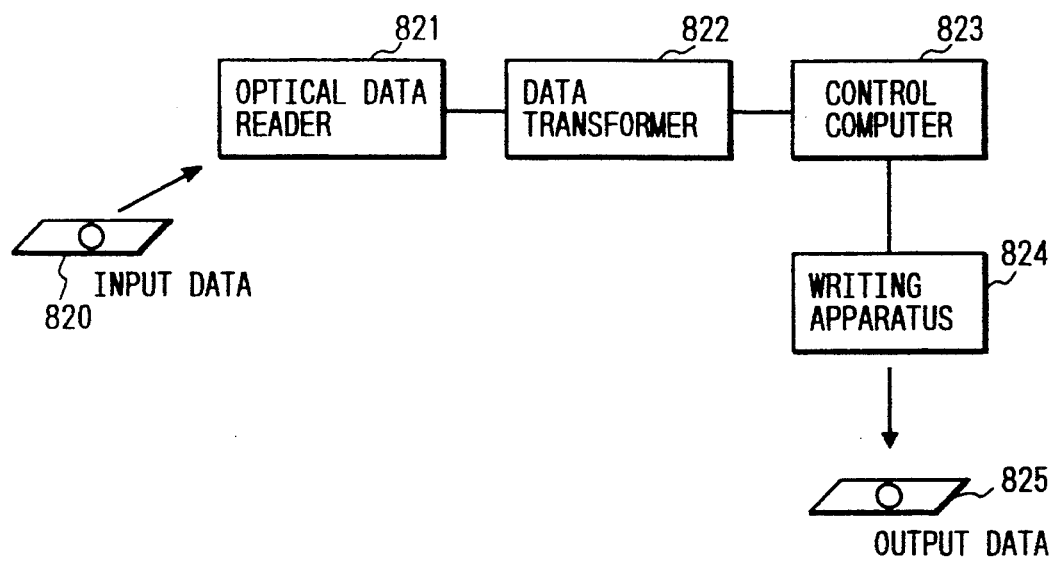
FIG. 28 is a method for storing data on a storage medium.

The next explanation will be on storing data on a storage medium, the method of which is explained in FIG. 28. An input medium 820 for documents containing input data which is comprised of map data is first put through an optical data reader (scanner) 821 for digitization of input data, and then transformed at a data transformer 822 into data for a writing apparatus 824 based on an electron beam drawing apparatus. Editing of input data such as correction and composition can be performed at this point in time, or at an optical data reader 821. Further, contour lines on the map are identified here and their altitudes are judged, determining an electron beam dose according to these altitudes. At this time, electron beam dose is determined according to the altitude on the map so that the height on storage medium can be obtained after the resist is developed. Then the transformed data is forwarded to a control computer 823 of a writing apparatus 824 and an ordinary electron beam drawing is performed on a storage medium 825. The area to be stored is not limited to the size of a scanning area for one electron beam inside a reading apparatus, and plural areas can also be stored. While a silicon wafer with resist coating is the most common storage medium, it is not the only medium. A storage medium 825 after the drawing is used as a storage medium to be used after going through the foregoing process such as developing. While a completed storage medium 825 can be used as it is, it can be made smaller through a process such as cutting and shall be used in sizes according to purpose. Further, it is desirable to provide a damage-proof treatment after cutting by putting it inside a holder.

Figure 29:
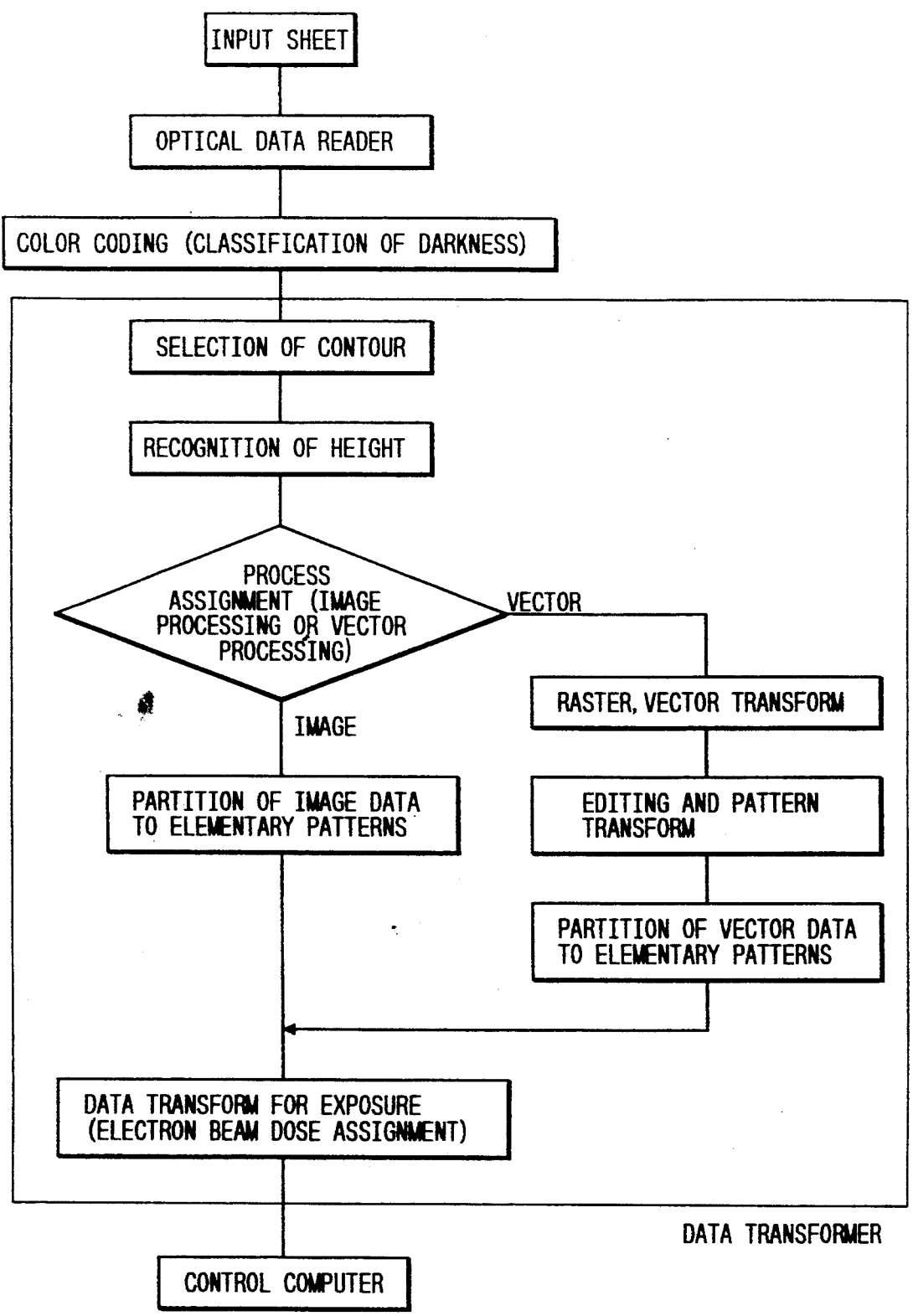
FIG. 29 is a diagram explaining the flow of data from an input sheet to input data for electron beam drawing.

At this point, the flow of data from an input pattern to creation of input data for electron beam drawing is explained by using FIG. 29. Input sheet is read by an optical data reader (scanner) and sent to a data transformer after digital data is generated. At the data transformer, color coding including classification of darkness is first performed to identify the color and darkness of the input screen. This is followed by extraction of contour lines in the map data and recognition of their altitude. Then a display installed on the data transformer is used to divide into specific areas, assigning whether to process each area as image data which is a mere congregate of points or as vector data which is expressed by starting point, direction and length. In the case of the former, although any pattern can be written, editing such as addition of a pattern and pattern transformation such as rotation and magnification cannot be performed. Meanwhile, in the case of the latter, pattern transformation can be performed even though patterns that can be written is limited. For this reason, it is necessary to specify the type of data depending on the purpose of input screen in question. Following the specification of the foregoing, partition of data in areas that have been assigned as image data into elementary patterns such as rectangles that are permitted in electron beam writing. Meanwhile, in areas that have been assigned as vector data, partition of vector data to elementary patterns is performed as in image data, after processing such as rastor-vector transformation, editing and pattern transformation for introduction of vector are completed. Then data is sent to the control computer of a writing apparatus after the two post-element partition patterns are merged and format transformation to electron beam drawing data is performed. At this time, the electron beam dose which accompanied the previous altitude judgment is assigned. The assigned value can be the standard value that has been given to a data transformer in advance, or can be assigned by the user according to necessity by checking the input data.

The foregoing data transformer and control computer include at least a CPU and a memory for storing the program, and realizes the foregoing process flow in its software.

Further, compactization of the entire system was achieved by using a fine electric field emitter as a source of generating the foregoing electron beam.

While the case of an electron beam was described in the foregoing embodiment as a method of writing and reading stored data, similar results were obtained by using charged particles such as ion beam and light, X ray, gamma ray, scanning tunneling electron microscope or atomic force microscope.

Furthermore, a mobile unit is not limited to a four-wheel vehicle, and one-wheel, two-wheel and three-wheel vehicles as well as wheelchair are also acceptable.

Embodiment 14

Figure 30:
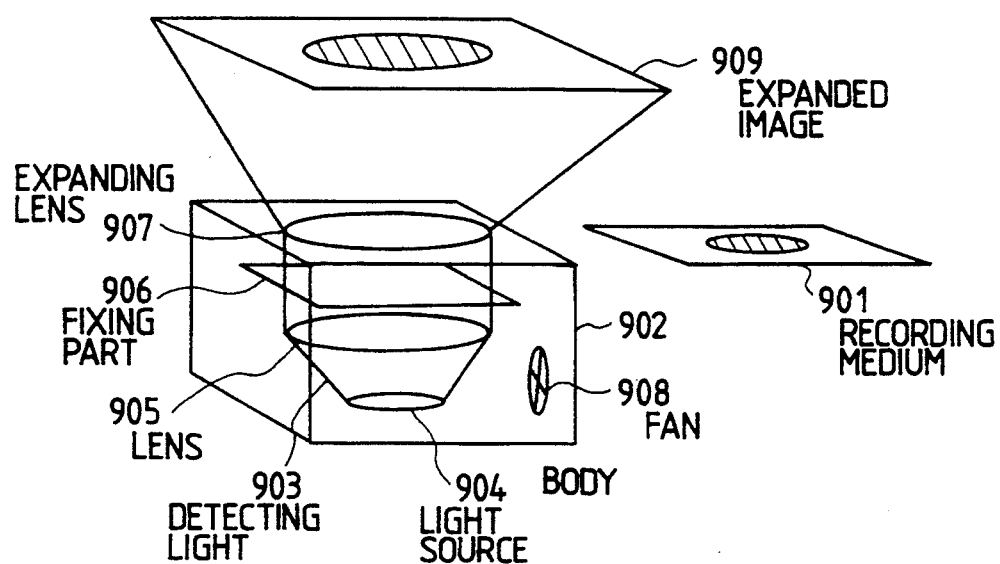
FIG. 30 is a diagram explaining a data display device.

A diagram explaining a data display unit concerning the present invention is shown in FIG. 30. A storage medium 901 is constructed in the form of a card and is inserted into the body 902. Installed on the body 902 are a light source 902 which generates a detecting light 903 (visible light in this case), a lens 905, a fixing part 906 which supports the storage medium, an expanding lens and a fan 908 for heat discharge and air cooling. Among them, a light source 904 and a fan 908 are battery driven so that they will be portable and will not require an electric outlet. A fan 908 will not be required in some cases. Rechargeable batteries are desirable in terms of operation. Documents and map data that are contained in a storage medium 901, and reading is performed by expanding them.

Projection of data will be explained at this point. As stated in the following, data is stored inside a storage medium 901. An expanded image 909 of data is obtained by irradiating a detecting light 903 on this and expanding the transmitted light through an expanding lens 907. The place on which an expanded image is projected is not limited to a screen and can be determined by selecting the desired direction which is possible due to the compact size of the body. For instance, any surface such as desktop, wall, ground including road and paper can be selected.

The rate of expansion can be selected at will between 10 times to 10,000 times according to the distance between an expanding lens 907 and an expanded image. A gap in optical path of a detecting light 903 occurs in some places due to storage of data at different height in a storage medium 901 as stated above, which, in turn, creates in difference in intensity of light after transmission, thereby resulting in substantial increase in data volume as recognition at the time of reading data becomes easier compared to the past.

While a method in which a detecting light 903 transmitted through a storage medium 901 was adopted here, similar results were obtained by using a method of projecting an image obtained when a detecting light 903 is reflected after it is irradiated on a storage medium 901.

In addition, although a method of reading stored data by irradiating visible light on a storage medium 901 was described in this embodiment, an energy ray which is irradiated is not limited to this and can be electron beam, ultraviolet ray, X ray, ion beam or gamma ray. At that time, the section that expands and projects an energy ray (e.g. reflection electron, secondary electron and photoelectron) shall be attached.

When the stored data is map data, for instance, the present invention can be applied for storing at different height at each storage medium such as contour line, road and railroad to facilitate recognition at an expanded image 909. When the stored data is a document, for instance, the contrast of character images in an expanded image 909 can be changed by changing the storing height for each section of the character to facilitate visual recognition.

Figure 31:
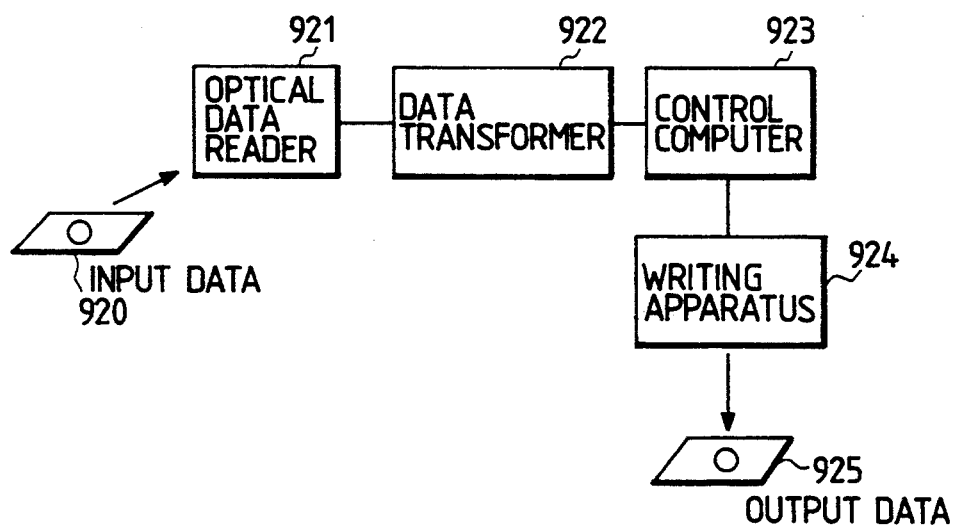
FIG. 31 is a method for generating stored data patterns.

The next explanation concerns the method of generating the pattern of data to be stored. Here, a method using an electron beam will be described. FIG. 31 explains its method. An input medium 920 such as document containing input data comprised of map data is first put through an optical data reader 921 for digitization of input data. Then, it is transformed at a data transformer 922 into data based on an electron beam drawing device. At this point, editing of input data such as correction and composition can be performed at an optical data reader 921. Further, contour lines on the map are identified here and their altitudes are recognized. Then the electron beam dose is determined according to these altitudes. At this time, the electron beam dose is determined so that the height on storage medium can be obtained after the developing of resist according to the altitudes on the map. Then, the transformed data is transferred to a control computer 923 of a writing apparatus 924 to perform an ordinary electron beam drawing on a storage medium 925. The area to be stored is not limited to the size of a scanning area for one electron beam inside a reading apparatus, and plural areas can also be stored. While a glass plate with resist coating is the most common storage medium, it is not the only medium. A storage medium 925 after the drawing is used as a storage medium to be used after going through the foregoing process such as developing. While a completed storage medium 925 can be used as it is, it can be made smaller through a process such as cutting and shall be used in sizes according to purpose. Further, it is desirable to provide a damage-proof treatment after cutting by putting it inside a holder.

At this point, the flow of data from an input pattern to creation of input data for electron beam drawing is explained by using FIG. 32. Input sheet is read by an optical data reader (scanner) and sent to a data transformer after digital data is generated. At the data transformer, color coding including classification of darkness is first performed to identify the color and darkness of the input screen. Then a display installed on the data transformer is used to divide into specific areas, assigning whether to process each area as image data which is a mere congregate of points or as vector data which is expressed by starting point, direction and length. In the case of the former, although any pattern can be written, editing such as addition of a pattern and pattern transformation such as rotation and magnification cannot be performed. Meanwhile, in the case of the latter, pattern transformation can be performed even though patterns that can be written is limited. For this reason, it is necessary to specify the type of data depending on the purpose of input screen in question. Following the specification of the foregoing, partition of data in areas that have been assigned as image data into elementary patterns such as rectangles that are permitted in electron beam writing. Meanwhile, in areas that have been assigned as vector data, partition of vector data to elementary patterns is performed as in image data, after processing such as rastor-vector transformation, editing and pattern transformation for introduction of vector are completed. Then data is sent to the control computer of a writing apparatus after the two post-element partition patterns are merged and format transformation to electron beam drawing data is performed. At this time, it becomes possible to change the height on the completed storage medium by assigning the electron beam dose for each drawing pattern. The assigned value can be the standard value that has been given to a data transformer in advance, or can be assigned by the user according to necessity by checking the input data.

The foregoing data transformer and control computer include at least a CPU and a memory for storing the program, and realizes the foregoing process flow in its software.

Further, compactization of the entire system was achieved by using a fine electric field emitter as a source of generating the foregoing electron beam.

While the case of an electron beam was described in the foregoing embodiment as a method of writing and reading stored data, similar results were obtained by using charged particles such as ion beam and light, X ray, gamma ray, scanning tunneling electron microscope or atomic force microscope to expand the signal obtained from there.

In this embodiment, the rate of expansion was adjusted by selecting the distance between an expanding lens 907 and an expanded image 909, an expanding lens with different magnification rate can be used and the distance with the fixing part can be made adjustable. This has made it possible to select the rate of expansion through adjustment of an optical system and obtain an expanded image 909 without being influenced by the distance between an expanding lens 907 and an expanded image 909.

Further, while reading stored data in a storage medium 901 through projection was explained in this embodiment, it was also possible to read store data by possessing a system for expanding the transmitted or reflected portion of an energy ray that was irradiated on a storage medium or an energy ray that was generated anew through irradiation to observe the image that was formed.

Thus, the present invention is superior in terms of handling a large volume of data as is capable of storing data in higher density compared to the conventional method as the foregoing data is stored at different position and height in a storage medium at a high density data storage medium which stores data in high density by using particle beam and a storage device using such medium. Further, it is particularly effective in storing and reading map data as it is capable of performing the foregoing storage with high precision.

What is claimed is:

1. A high density data storage medium comprising:
steps with multiple levels of one of depth and height formed in predetermined plural areas of a substrate surface, wherein the one of depth and height of said steps corresponds on a one-to-one basis with predetermined information and said information is recorded randomly on said substrate surface.

2. A high density data storage medium according to claim 1, wherein the form of said information is ROM.

3. A high density data storage medium according to claim 1, wherein said information is one-dimensional information.

4. A high density data storage medium according to claim 3, wherein said one-dimensional information is topographic height shown by wavelength, frequency and oscillation of vibration.

5. A high density data storage medium according to claim 1, wherein said information is two-dimensional information.

6. A high density data storage medium according to claim 5, wherein said two-dimensional information is character, picture, map, photograph, book, document and image.

7. A high density data storage medium according to claim 1, wherein said information is three-dimensional information.

8. A high density data storage medium according to claim 7, wherein said three-dimensional information includes road overpass and is wind and water velocity.

9. A high density data storage medium according to claim 1, wherein said information is characterized as being a digital signal.

10. A high density data storage medium according to claim 1, wherein said information is characterized as being an analog signal.

11. A high density data storage medium according to claim 1, wherein said information is characterized as being stored in at least one of an insulator, a semiconductor and an electric conductor.

12. A high density data storage medium according to claim 11, wherein said insulator is characterized as containing at least one of a resist, and an organic resin such as one of a plastic and a glass.

13. A high density data storage medium according to claim 11, wherein said semiconductor is characterized as including at least one of a IV group semiconductor, a III-V group compound semiconductor and a II-VI group compound semiconductor.

14. A high density data storage medium according to claim 13, wherein said IV group semiconductor is characterized as including at least one of a silicon, a germanium and a compound of one of silicon and germanium.

15. A high density data storage medium according to claim 11, wherein said electric conductor is characterized as being a metal.

16. A high density data storage medium according to claim 15, wherein said metal is characterized as including at least one of aluminum and stainless steel.

17. A high density data storage medium according to claim 1, wherein said substrate is characterized as being at least one of an insulator, semiconductor or electric conductor.

18. A high density data storage medium according to claim 1, wherein surface of said high density data storage medium is characterized as being covered with a protection film.

19. A high density data storage medium according to claim 1, wherein said high density data storage medium is characterized as being on one of a card, a pendant and a disk.

20. A storage device characterized as using a high density data storage medium according to claim 1.

21. A navigation system comprising:

a means for storing or reading map data on and from the storage medium according to claim 1 by using electron beam in a navigation system which is equipped with a storage medium for storing map data and a means for detecting the current position of a mobile unit and performs movement control of a mobile unit by comparing the foregoing map data and the current position of mobile unit.

22. A navigation system according to claim 21 further comprising:

a means for recognizing topography by having an energy ray for detection scan through the surface of storage medium when reading the map data of the foregoing storage medium and comparing it with signals transmitted from outside to determine the current position of a mobile unit.

23. A navigation system according to claim 21, wherein steps are formed on the surface of the foregoing storage medium according to the altitude of topography.

24. A high density data storage medium according to claim 1, wherein said information randomly arranged on said substrate surface is readable by using light, electron beam, charge particle, X-ray or gamma-ray.

25. A high density data storage medium comprising: steps with "n" levels of one of depth and height formed in predetermined plural areas on a substrate surface, wherein the one of depth and height of said steps independently corresponds on a one-to-one basis with predetermined "n-value" data information, wherein "n" is a value of at least 3, and the information is recorded on the data storage medium.

26. A high density data storage medium according to claim 25, wherein said information is characterized as two-dimensional information.

27. A high density data storage mdium according to claim 26, wherein said two-dimensional information is characterized as being character, picture, map, photograph, book, document and image.

28. A high density data storage medium according to claim 25, wherein said information is characterized as being three dimensional information.

29. A high density data storage medium according to claim 28, wherein said three-dimensional information is characterized as including road overpass and being wind and water velocity.

30. A high density data storage medium according to claim 25, wherein said information is characterized as being a digital signal.

31. A high density data storage medium according to claim 25, wherein said information is characterized as being an analog signal.

32. A high density data storage medium according to claim 25, wherein said information is characterized as being stored in at least one of an insulator, a semiconductor or an electric conductor.

33. A high density data storage medium according to claim 32, wherein said insulator is characterized as containing at least one of a resist, and an organic resin of one of a plastic and a glass.

34. A high density data storage medium according to claim 32, wherein said semiconductor is characterized as including at least one of a IV group semiconductor, a III-V group compound semiconductor and a II-VI group compound semiconductor.

35. A high density data storage medium according to claim 34, wherein said IV group semiconductor is characterized as including at least one of a silicon, a germanium and a compound of one of silicon and germanium.

36. A high density data storage medium according to claim 32, wherein said electric conductor is characterized as being a metal.

37. A high density data storage medium according to claim 36, wherein said metal is characterized as including at least one of aluminum and stainless steel.

38. A high density data storage medium according to claim 25, wherein said substrate is characterized as being at least one of an insulator, semiconductor and electric conductor.

39. A high density data storage medium according to claim 25, wherein surface of said high density data storage medium is characterized as being covered with a protection film.

40. A high density data storage medium according to claim 25, wherein said high density data storage medium is characterized as being on one of a card, a pendant and a disk.

41. A storage device characterized as using a high density data storage medium according to claim 25.

42. A high density data storage medium according to claim 25, wherein said information is characterized as being random accessed.

43. A high density data storage medium according to claim 25, wherein said information is characterized as being in ROM format.

44. A high density data storage medium according to claim 25, wherein said information is characterized as one-dimensional information.

45. A high density data storage medium according to claim 44, wherein said one-dimensional information is characterized as topographic height shown by wavelength, frequency and oscillation of vibration.

46. A reading apparatus for high density data, comprising: a storage medium according to claim 1 or claim 25; a data reading apparatus body; a data storage section that can be taken on and off from the foregoing data reading apparatus on which reading data is stored; a data retrieval analysis device which processes reading data; a data input apparatus for inputting data which is necessary for reading; and a data output apparatus which outputs data that has been read.

47. A large volume filing system comprising: a storage medium according to claim 1 or claim 25; and a means for storing or reading data in and from the foregoing storage medium by using electron beam in a large volume filing system which reads and outputs the content of data that has been stored in a storage medium according to retrieving information.

48. A large volume filing system according to claim 47, wherein steps possessing multiple levels of depth or height formed in predetermined plural areas of the foregoing storage medium surface, with depth or height of the foregoing steps independently corresponding on one-on-one basis with predetermined information.

49. A large volume filing system according to claim 47, wherein retrieving information is also stored at the time of storing the content of data to the foregoing storage medium.

50. A large volume filing system according to claim 49 further comprising:

a mechanism that stores predetermined information as the stage on which a storage medium is installed moves in an input apparatus which stores the content of data along with retrieving information; and a mechanism that reads predetermined information as the stage on which a storage medium is installed moves in an output apparatus according to retrieving information to read and output the content of data and reads the prescribed data.

51. A high density data storage medium responsive to an energy beam for writing and reading predetermined information, comprising, steps of multiple levels of one of depth and height formed in predetermined plural areas of a substrate surface, the one of depth and height of the steps corresponding on a one-to-one basis with the predetermined information to be stored by writing, and the information being recorded in a non-track form on the substrate surface.

52. A high density storage medium, comprising, steps with at least two levels of one of depth and height including a substrate surface, the one of depth and height of the steps corresponding on a one-to-one basis with predetermined information, the steps having a spatially controlled arrangement thereof, and the information is recorded on the data storage medium.

53. A high density data storage medium according to claim 51 or claim 52, wherein the form of the information is ROM.

54. A high density storage medium according to claim 51 or claim 52, wherein the substrate is characterized as being at least one of an insulator, a semiconductor and electric conductor.

55. A high density data storage medium according to claim 52, wherein the spatial control of the steps portions for positioning of energy rays to read the steps are not formed on the substrate.

56. A high density data storage medium, comprising, steps with at least three levels of one of depth and height including a substrate surface, the one of depth and height of the steps corresponding on a one-to-one basis with predetermined information, and the information is recorded on the data storage medium.

57. A high density data storage medium according to claim 56, wherein the information is characterized as being random accessed.

58. A high density data storage medium according to claim 56, wherein the form of the information is ROM.

59. A high density data storage medium according to claim 56, wherein the substrate is characterized as being at least one of an insulator, semiconductor and electric conductor.

60. A high density data storage medium according to claim 1, claim 25, claim 51, claim 52 or claim 56, wherein the steps with at least two levels of one of depth and height including the substrate surface are formed by irradiating an energy sensitive material installed on the substrate surface with an energy ray corresponding on a one-to-one basis with predetermined information, and at least one of developing the material and etching the material after development so as to form the steps.

61. A high density data storage medium according to claim 60, wherein the energy ray is an electron beam.

62. A high density data storage medium according to claim 1, claim 25, claim 51, claim 52 or claim 56, wherein the steps with at least two levels of one of depth and height including the substrate surface are formed by processing with one of a scanning tunnelling microscope and focused ion beams to form the steps corresponding on a one-to-one basis with predetermined information on the substrate surface.

63. A high density data storage medium according to claim 1, claim 25, claim 51, claim 52 or claim 56, wherein the steps with at least two levels of one of depth and height including the substrate surface in which the levels correspond on a one-to-one basis with predetermined information are copied utilizing a stamper.

64. A high density data storage medium according to claim 1, claim 25, claim 51, claim 52 or claim 56, for a large volume filing system including means for one of storing and reading data in and from the storage medium by an electron beam for reading and outputting the content of the data stored in the storage medium in accordance with the read out information.

65. A high density data storage medium according to claim 1, claim 25, claim 51, claim 52 or claim 56, wherein retrieval information is stored at the time of storing the content of the data to the high density data storage medium, the retrieval information being stored at spatially different locations than that of the data information.

66. A high density data storage medium according to claim 1, claim 25, claim 51, or claim 56, for a large volume filing system including means for storing the predetermined information on the data storage medium installed on a stage for movement in an input apparatus which stores the content of data together with retrieval information, and means for reading predetermined information as the stage on which the storage medium is installed for movement in an output apparatus according to retrieval information for reading and outputting the content of data and reading the prescribed data.

67. A high density storage medium according to claim 1, claim 25, claim 51, claim 52 or claim 56, for a navigation system including means for at least one of storing and reading map data on and from the high density data storage medium utilizing an electron beam, the navigation system having the storage medium for storing map data, and means for detecting the current position of a mobile unit and for enabling movement control of the mobile unit by comparing the map data of the high density data storage medium with the current position of the mobile unit.

68. A high density data storage medium according to claim 1, claim 25, claim 51, claim 52 or claim 56, wherein the information on the substrate surface is read by direct detection of the one of depth and height of the steps by one of a scanning tunnelling microscope and atomic force microscope.

69. A high density data storage medium according to claim 1, claim 25, claim 51, claim 52 or claim 56, wherein the steps are formed in a horizontal direction of a substrate surface to store first information and multiple levels of one of depth and the one of height and depth of the steps is formed in the vertical direction of the substrate surface to store second information.

70. A high density data storage medium according to claim 1, claim 21, claim 51 claim 52 or claim 56, having regions in which input data is stored as shrunk images of the input data, and regions in which input data is stored in a coded format.

71. A high density data storage medium comprising:
steps with multiple levels of one of depth and height that was formed at predetermined plural areas on a substrate surface, wherein the one of depth and height of said steps independently corresponds on a one-to-one basis with predetermined information, said substrate has a form of one of a card and a pendant, and the information is recorded on the data storage medium.

* * * * *